ized Patent

(12) United States Patent
Guo et al.

(10) Patent No.: US 9,893,981 B2
(45) Date of Patent: Feb. 13, 2018

(54) RESOURCE AWARE MULTI-TASK ROUTING IN MULTI-HOP HETEROGENEOUS WIRELESS NETWORKS

(71) Applicant: Mitsubishi Electric Research Laboratories, Inc., Cambridge, MA (US)

(72) Inventors: Jianlin Guo, Newton, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 75 days.

(21) Appl. No.: 15/069,250

(22) Filed: Mar. 14, 2016

(65) Prior Publication Data

US 2017/0264532 A1  Sep. 14, 2017

(51) Int. Cl.
| | |
|---|---|
| H04L 12/24 | (2006.01) |
| H04L 12/761 | (2013.01) |
| H04L 12/715 | (2013.01) |
| H04L 5/00 | (2006.01) |
| H04L 29/06 | (2006.01) |

(52) U.S. Cl.
CPC ............ *H04L 45/16* (2013.01); *H04L 5/0053* (2013.01); *H04L 45/04* (2013.01); *H04L 65/4076* (2013.01)

(58) Field of Classification Search
CPC ............................. H04W 40/32; H04L 45/16
See application file for complete search history.

(56) References Cited

U.S. PATENT DOCUMENTS

| | | | |
|---|---|---|---|
| 8,773,992 | B2 | 7/2014 | Lai |
| 2009/0274157 | A1 | 11/2009 | Vaidya et al. |
| 2012/0307825 | A1* | 12/2012 | Hui .................... H04W 28/14 370/390 |

OTHER PUBLICATIONS

Guo et al. Resource aware routing protocol in heterogeneous wireless machine-to-machine networks, 2015 IEEE Global communications conference, Dec. 6, 2015. pp. 1-6.
Kulkarni et al. H-MOHRA heterogenous multi-objective hybrid routing algorithm for mobile wireless sensor networks, 2014 IEEE global conference on wireless computing and networking, IEEE, Dec. 22, 2014, pp. 249-253.
Amjad et al. QoS-Aware and heterogeneously clustered routing protocol for wireless sensor networks, IEEE Access, vol. 5, Dec. 22, 2014. pp. 10250-10262.

* cited by examiner

*Primary Examiner* — Kevin C Harper
(74) *Attorney, Agent, or Firm* — Gene Vinokur; James McAleenan; Hironori Tsukamoto

(57) ABSTRACT

A multi-hop heterogeneous wireless network is partitioned into a set of subnetworks including a first subnetwork having a first sink node and a second subnetwork having a second sink node. A node forms parts of the first and the second subnetworks and has different modes of operations (MOP) depending on the subnetwork. For example, the node has a first MOP specifying a type of the routing in the first subnetwork and a second MOP specifying a type of the routing in the second subnetwork. The node determines the MOD based on available routing resource of the node that is independent from the subnetwork and based on required routing resource that varies among the subnetworks. The node routs packets in the first subnetwork according to the first MOP and routing packets in the second subnetwork according to the second MOP.

18 Claims, 17 Drawing Sheets

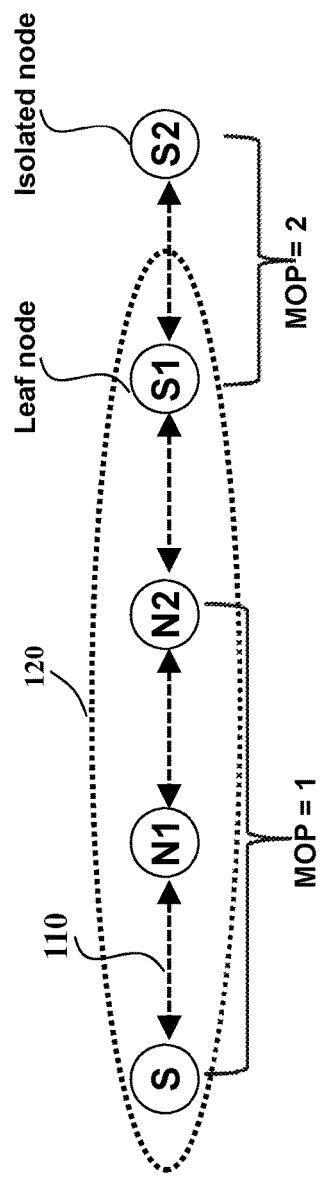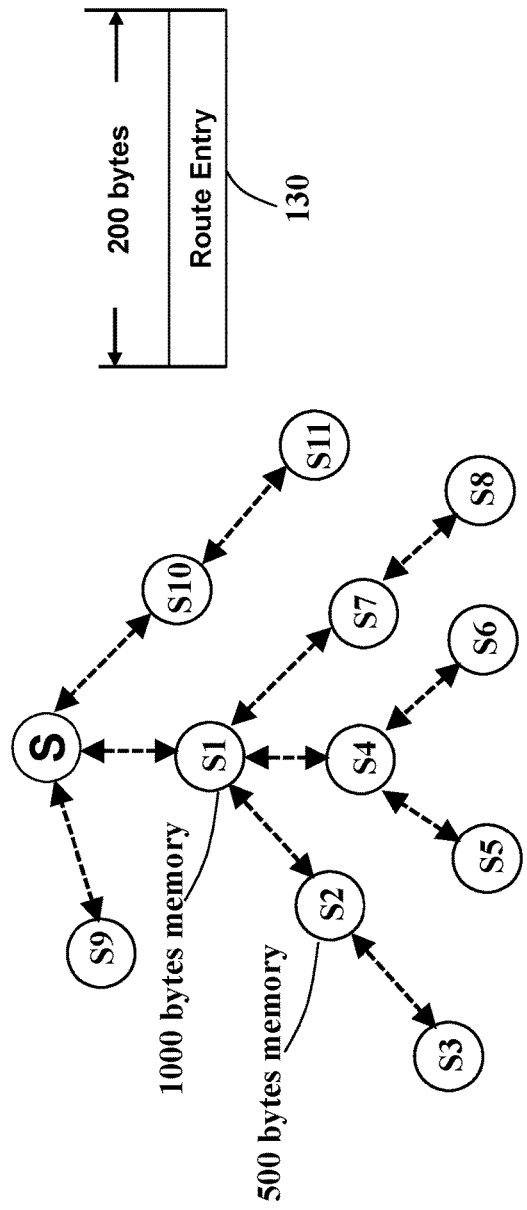
Fig. 1A
Fig. 1B

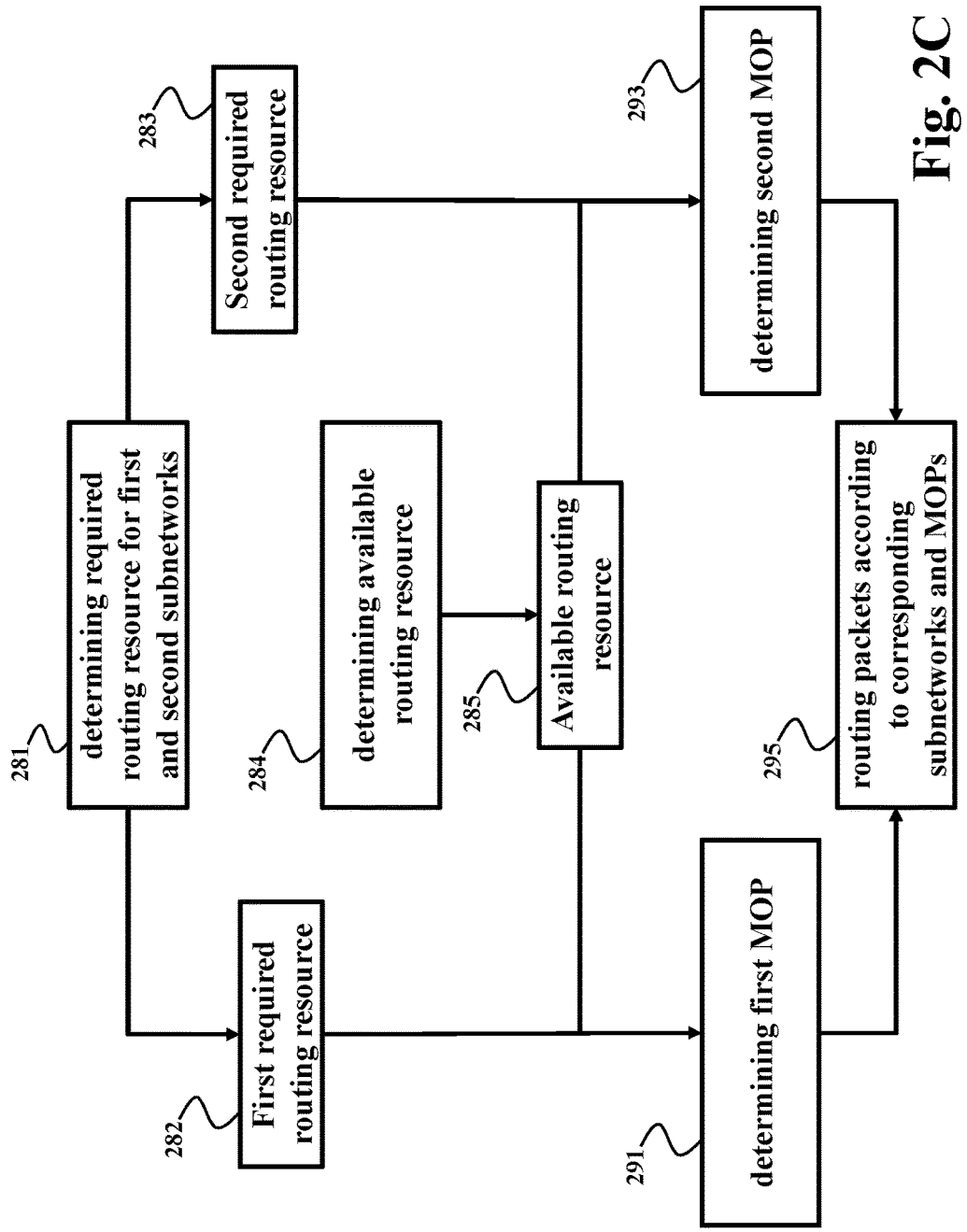

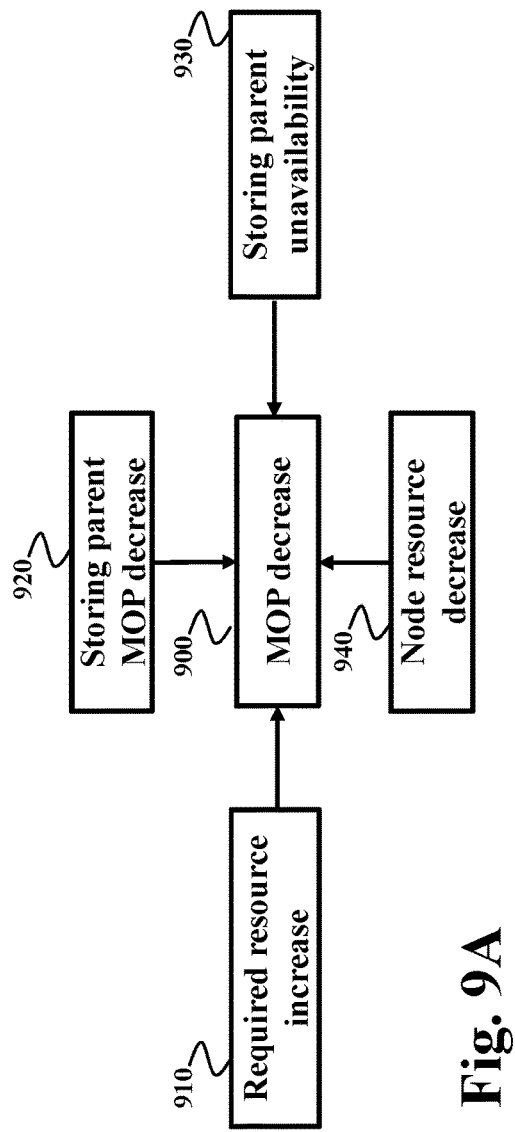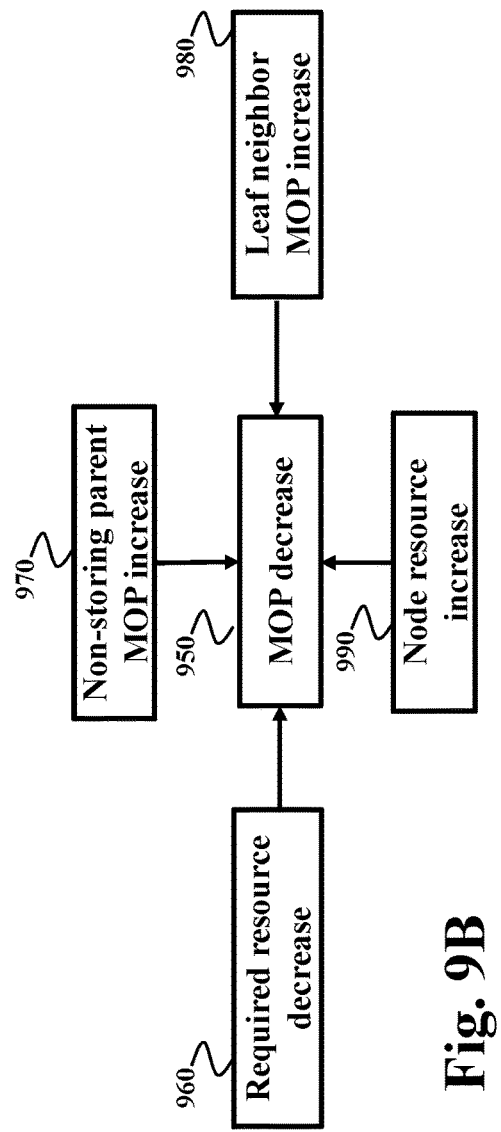
Fig. 9A
Fig. 9B

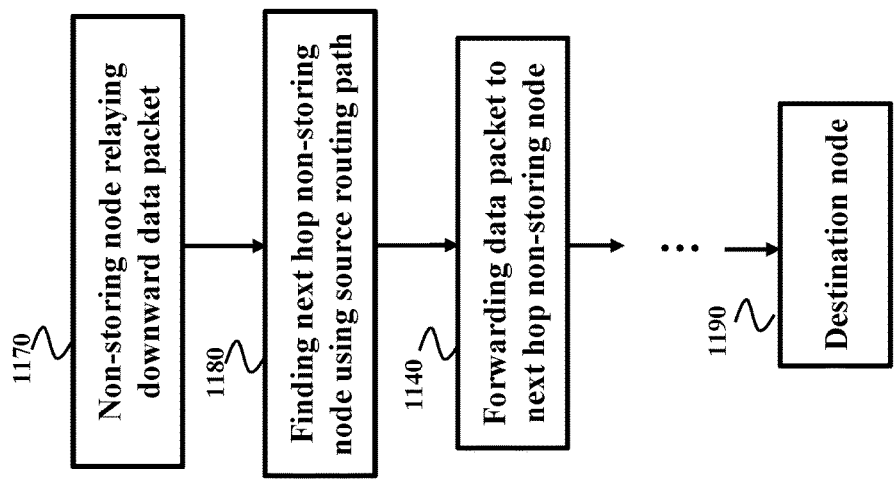

RESOURCE AWARE MULTI-TASK ROUTING IN MULTI-HOP HETEROGENEOUS WIRELESS NETWORKS

FIELD OF THE INVENTION

This invention relates generally to routing packets in wireless networks, and particularly to routing packets in multi-hop wireless networks including nodes with heterogeneous resources and capabilities.

BACKGROUND OF THE INVENTION

A wireless networks can be classified into homogeneous and heterogeneous networks based on resource and capability of the nodes of the network. In a homogeneous network, such as conventional wireless sensor network, all nodes have same resources and capabilities. On the other hand, in a heterogeneous wireless network, such as wireless Internet of Things (IoT) network, nodes have different resources and capabilities. Some nodes have more resources such as memory, storage, process power, energy supply, and communication capability. Other nodes have limited resources and capabilities. As a result, some nodes can perform more functions and other nodes can only perform limited functions.

Conventional hierarchical routing methods are designed for homogeneous wireless network and do not consider node heterogeneity and application requirement. For example, U.S. Pat. No. 8,773,992 B2, "methods and apparatus for hierarchical routing in communication networks", determines a plurality of constrained weighted paths to connect pairs of border nodes of a cluster in the communication network, each constrained weighted path having a respective bandwidth and a respective weight. The constrained weighted path selection is based on a bandwidth threshold. It does not address how to form cluster and what metrics are used to form cluster. It does not consider whether or not selected nodes having sufficient resources to perform connection with other clusters. Therefore, only homogeneous network is considered.

US 2009/0274157 A1, "method and apparatus for hierarchical routing in multiprocessor mesh-based systems", describes a method and apparatus for hierarchical routing in mesh systems. The method splits a mesh network of nodes into a plurality of rectangular regions, determines a partition route from a source region to a destination region of the plurality of rectangular regions, and provides a region route from a source node within one rectangular region to a destination node within the same rectangular region. The method may also include routing a packet from a source node within the source region to a destination node within the destination region using the partition route and the region route. However, this method is also designed for homogeneous network, does not consider node resources, routing metrics and objective functions, and only considers reachability.

The IPv6 Routing Protocol for Low Power and Lossy Networks (RPL) is a routing protocol developed by the Internet Engineering Task Force (IETF). The RPL organizes nodes of network into a tree-like topology called the Destination Oriented Directed Acyclic Graph (DODAG). Based on pre-determined memory thresholds, RPL defines four mode of operation (MOP): MOP=0, MOP=1, MOP=2 and MOP=3. However, the RPL requires all router nodes in a network can have same MOP, i.e., all router nodes can have MOP same as the MOP of sink node. If a node has a MOP different from the MOP of the sink node, the node can only join network as leaf node and therefore, cannot extend the network. As a result, RPL can partition a physically connected network. In addition, RPL requires a single objective function and same routing metrics within a network. As a result, RPL is also designed for homogeneous networks.

Accordingly, it is desirable to provide a resource aware routing method that adapts its routing functions based on different resources and capabilities of the nodes.

SUMMARY OF THE INVENTION

Some embodiments of the invention are based on a recognition that in a multi-hop heterogeneous wireless network, the network topology can be constructed based on different application requirements and resource requirements. For example, heterogeneous objective functions and routing metrics should be provided to nodes to select appropriate set of objective function and routing metrics to construct multi-tier and multi-cluster of the topology.

Some embodiments of the invention are based on a recognition that in a multi-hop wireless network, nodes with different resources can have different mode of operation (MOP) defining a type of routing used by the node. For example, the MOP can define that one or bi-directional routing, table routing or source routing. For example, a node should let other nodes know that the node does not resources to route any more.

Some embodiments of the invention are based on a realization that nodes can divide memory into different sections including a buffer section used to buffer packets and a routing section used to store information required to build and maintain network topology. For example, network identifier, neighbor information and routing table entry are stored in routing section.

Some embodiments of the invention are based on a realization that nodes can update its MOP in response to allocated routing memory, required routing memory, sensed network conditions, such as size of sub-network size and MOP change of neighboring nodes, and the change of available resources, such as one or combination of an available memory of the node, a processing power of the node, an available amount of energy for the node, and a communication capability of the node. A new set of MOP is defined such that different MOPs can correspond to different routing types of nodes in network, if more routing functions can be executed by the node then greater the MOP is. In such a manner, the nodes can signal its MOP to other nodes as an indication of type of routing. For example, a node may use MOP to indicate the node does not route.

In some embodiments of the invention, the nodes perform their routing in consideration of the routing types of other nodes as indicated by their MOPs and different routing objective functions as well as different routing metrics. Also, some embodiments construct hierarchical network topology to facilitate objective functions, routing metrics and routing preferences of K-Hop neighboring nodes.

Accordingly, some embodiments of the invention adapt the routing methods to changes in a state of the network by having a heterogeneous network including nodes with different MOPs and modifying MOP of at least one node in response to a change of operations of the node.

Accordingly, one embodiment discloses a method for routing packets in a multi-hop heterogeneous wireless network partitioned into a set of subnetworks including a first subnetwork having a first sink node and a second subnetwork having a second sink node, in which a node forms at least a part of the first subnetwork and at least a part of the second subnetwork. The steps of the method are performed using a processor of the node.

The method includes determining an available routing resource of the node as a function of an allocated routing memory (ARM) in the node and a remaining expected routing lifetime (ERL) of the node; determining at least one required routing resource of the node as a function of a routing protocol used by the node for a subnetwork, a logical location of the node in the subnetwork, and a data traffic in the subnetwork through the node, wherein the determining the required routing resource includes determining a first required routing resource of the node for the first subnetwork and determining a second required routing resource of the node for the second subnetwork, wherein the first required routing resource differs from the second required routing resource; determining, using the available routing resource and the first required routing resource, a first mode of operation (MOP) specifying a type of the routing of the node in the first subnetwork; determining, using the available routing resource and the second required routing resource, a second MOP specifying a type of the routing of the node in the second subnetwork, wherein the first MOP differs from the second MOP; and routing packets in the first subnetwork according to the first MOP and routing packets in the second subnetwork according to the second MOP.

Another embodiment discloses a multi-hop wireless network including multiple nodes with different computational and energy resources, in which the network is partitioned into a multiple subnetworks having a unique combination of objective functions and routing metrics, wherein at least one node joins multiple subnetworks and operates according to different modes of operation (MOPs) specifying different types of routing for different subnetworks.

Yet another embodiment discloses a node for routing packets in a heterogeneous wireless network including a transceiver to transmit and receive packets; a memory to store at least part of the packets, route entries, child-parent entries, K-Hop neighbor routing preferences; and a processor to join multiple subnetworks based on combinations of objective functions and routing metrics of the subnetworks and to determine different modes of operation (MOPs) specifying different types of routing for different subnetworks.

BRIEF DESCRIPTION OF THE DRAWINGS

FIG. 1A is an example of the Routing Protocol for Low Power and Lossy Networks (RPL) partitions of a physically connected network;

FIG. 1B is an example of different resource requirements for nodes at different positions in a network topology;

FIG. 2C is a block diagram of a method for routing packets in a multi-hop heterogeneous wireless network partitioned into a set of subnetworks according to some embodiments of the invention;

FIG. 9A is a schematic of conditions that can cause a node to decrease MOP according to some embodiments of the invention;

FIG. 9B is a schematic of conditions that can cause a node to increase MOP according to some embodiments of the invention;

FIG. 11C is a schematic of non-storing node relaying a downward packet to the destination using source routing path according to some embodiments of the invention.

DETAILED DESCRIPTION OF THE PREFERRED EMBODIMENTS

Figure 1C:
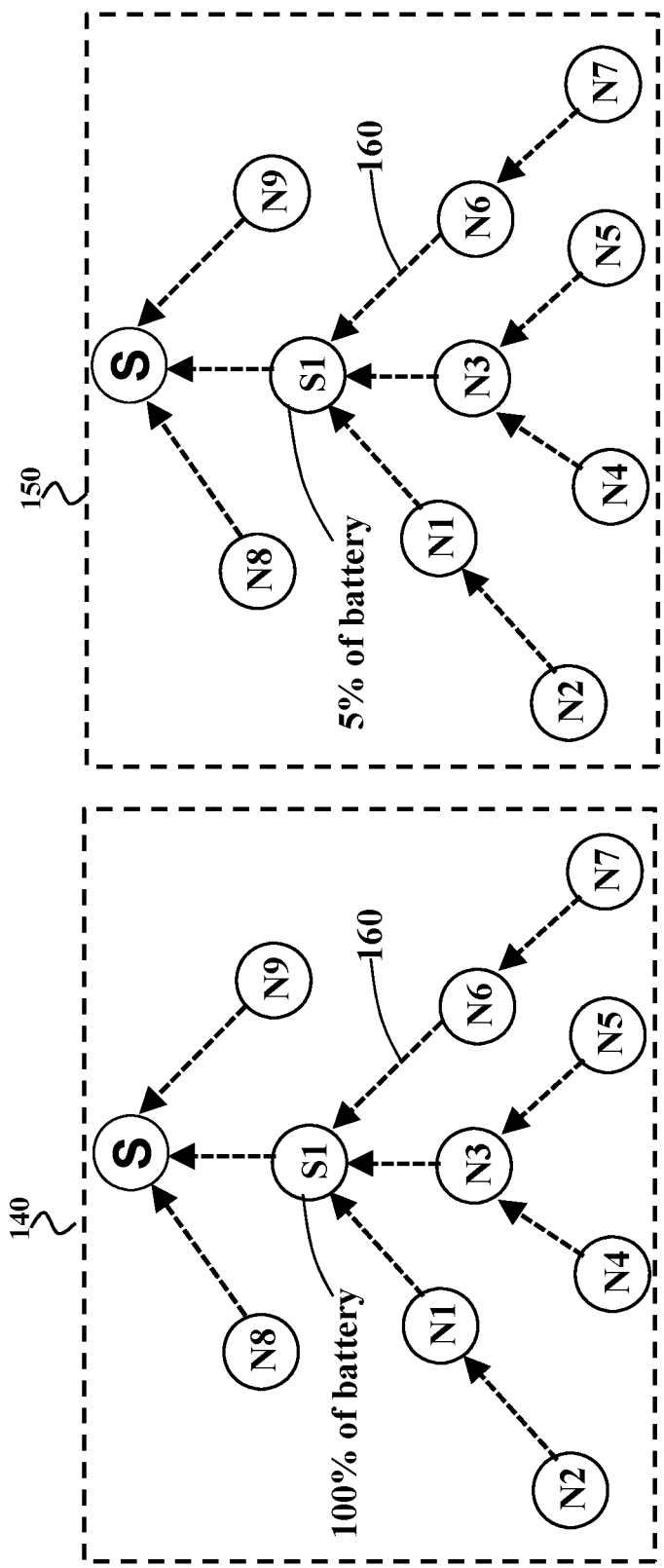
FIG. 1C is an example of the RPL affecting lifetime of a battery of a node.

In a heterogeneous wireless network, such as wireless Internet of Things (IoT) network, there can be tens thousands of nodes. These nodes are required to carry out different tasks. For example, one group of nodes can perform field monitoring, another group of nodes can transfer data for factory automation, and yet another group of nodes monitor building security. Different tasks have different requirements. In case of field monitoring, nodes are typically battery powered. These nodes do not send measurement data very often. Packet loss is not critical. The requirement of the routing here is prolonging battery lifetime. In case of factory automation, there are large amount of data transfer and data are required to be delivered reliably. The requirement here is reliability of the communication. In case of building security, there is no much data traffic. However, in case of any suspicious event, information can be immediately sent to control center. The requirement here is latency.

Therefore, network topology is required to adapt its functionality at different portion of network based on application requirements. Features of a network topology are determined by routing algorithm, metrics and objective functions used to build the topology. As a result, routing algorithm can apply different routing metrics and objective functions at different portion of heterogeneous network. For example, for field monitoring, energy related routing metric such as residual energy (RE) and lifetime related objective function such as minimum energy path should be used. For factory automation, high throughput routing metrics such as the expected transmission count (ETX) and the reliability related objective functions such as the highest reliability path should be used. For security monitoring, delay related routing metrics such as hop count (HC) and low latency related objective functions such as the shortest path should be used. Hierarchical network topology can be used to satisfy such requirements in a way that different routing metrics and objective functions are applied at different tiers and at different clusters at same tier of network topology.

To that end, some embodiments of the invention are based on a recognition that in a multi-hop heterogeneous wireless network, the network topology can be constructed based on different application requirements and resource requirements. For example, heterogeneous objective functions and routing metrics should be provided to nodes to select appropriate set of objective function and routing metrics to construct multi-tier and multi-cluster of the topology.

The IPv6 Routing Protocol for Low Power and Lossy Networks (RPL) is a routing protocol developed by the Internet Engineering Task Force (IETF). The RPL organizes nodes of network into a tree-like topology called the Destination Oriented Directed Acyclic Graph (DODAG). Based on pre-determined memory thresholds, RPL defines four mode of operation (MOP): MOP=0, MOP=1, MOP=2 and MOP=3. With MOP=0, RPL only supports one direction routing from the data nodes to the sink node, i.e., upward routing. RPL does not support routing from the sink node to the data nodes, i.e., downward routing. With MOP=1, RPL allows bi-direction routing and uses source routing for downward routing. To save memory, a node operating on MOP=1 does not store route entry for any other node. As a result, the MOP=1 is called a non-storing mode of operation. With MOP=2, RPL supports bi-direction routing and uses routing table for downward routing. A node operating on MOP=2 stores route entries for nodes in its sub-DODAG, i.e., sub-tree. However, with MOP=2, downward multicast is not supported. Therefore, the MOP=2 is called a storing mode of operation with no multicast support. With MOP=3, RPL enhances the MOP=2 by supporting downward multicast. Therefore, the MOP=3 is called a storing mode of operation with multicast support. The MOP=2 and MOP=3 require nodes to have larger memory space to store route entries.

However, the RPL requires all router nodes in a network to have same MOP, i.e., all router nodes can have MOP same as the MOP of sink node. To that end, some embodiments of the invention are based on realization that if a node has a MOP different from the MOP of the sink node, the node can only join network as leaf node and therefore, cannot extend the network.

FIG. 1A shows an example demonstrating such a realization. In this example, all nodes are physically connected via link 110. Sink node S, node N1 and node N2 have MOP=1. Node S1 and S2 have MOP=2. Because node S1 has MOP different from MOP of sink node, S1 can join DODAG topology 120 as leaf node. Therefore, S1 cannot extend network. As a result node S2 is isolated and cannot join network 120.

Some embodiments of the invention are based on recognition that the RPL does not consider the fact that the resource requirements are different for nodes at different position of network topology. The MOP determination based on pre-determined memory thresholds is not feasible even in homogeneous networks. For example, with same memory, a node away from the sink node can store all route entries in its sub-tree; however, a node close to the sink node cannot store all route entries in its sub-tree. Furthermore, it is even possible that a node with smaller memory can store all route entries and a node with larger memory cannot store route entries.

FIG. 1B shows an example demonstrating such recognition. In this example, a route entry 130 is 200 bytes, node S1 has 1000 bytes memory and node S2 has 500 bytes memory. However, it only requires 200 bytes memory for S2 to store route entry for node S3 and it requires 1400 bytes memory for S1 to store route entries for nodes S2 to S8. As a result, node S1 with larger memory cannot store all route entries.

In addition, some embodiments of the invention are based on realization that the RPL does not consider consumption of unsustainable resources such as battery energy in network operation.

FIG. 1C shows an example demonstrating such a realization. In this example, a node S1 has 100% of battery at network start 140 and therefore, operates on MOP=2. Nodes N1 to N7 forward their packets 160 to sink node S via node S1. However, S1 is battery powered. As network operates, S1 spends its energy to relay data packets for nodes N1 to N7 in its sub-tree. At current time 150, S1 only has 5% of battery energy so that S1 should only use its energy to send its own data. In this case, nodes N1 to N7 should forward their packets 160 via N8 and N9. The problem is that nodes N1 to N7 do not know battery level of S1 and keep forwarding their packets 160 via S1. As a result, S1 will soon become a dead node.

Accordingly, different embodiments of the invention to provide a resource aware multi-task routing method that allows mixed modes of operation to avoid partitioning a physically connected network, adapts its routing functions based on resource requirements, considers resource usage in network operation, and allows heterogeneous objective functions and routing metrics to build hierarchical routing topology for multiple tasks in a network.

Figure 2A:
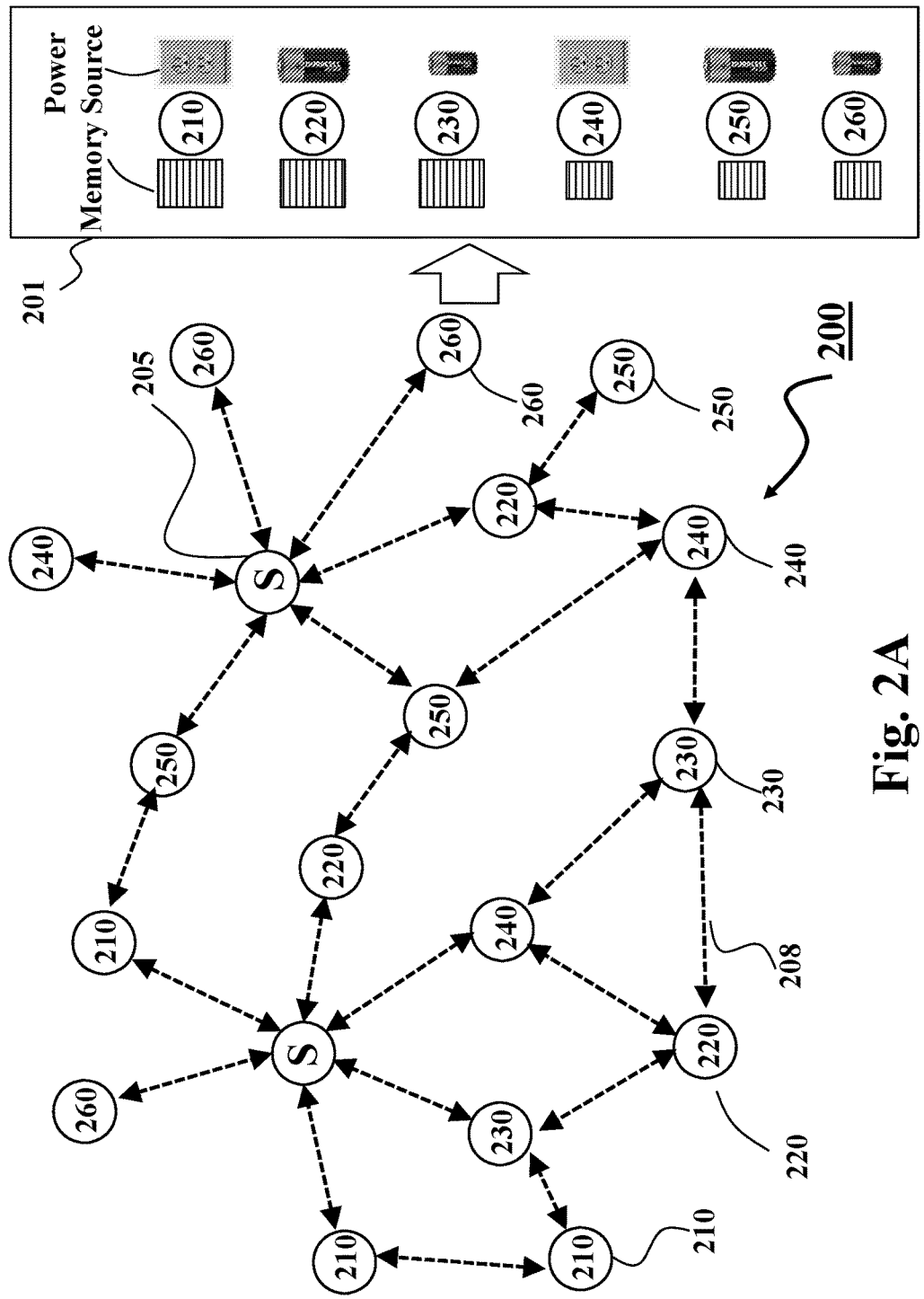
FIG. 2A is a schematic of the multi-hop heterogeneous wireless network according to some embodiments of the invention.

FIG. 2A shows a schematic of the multi-hop heterogeneous wireless network 200 according to some embodiments of the invention. The network includes multiple nodes with different memory and energy resources 201. The network includes sink nodes 205, data nodes 210 with big memory and grid power source, data nodes 220 with big memory and large battery power source, data nodes 230 with big memory and small battery power source, data nodes 240 with small memory and grid power source, data nodes 250 with small memory and large battery power source, and data nodes 260 with small memory and small battery power source. All nodes communicate via wireless link 208. The direction of link shows physical reachability of the node. Some nodes can transmit packets directly to a sink node. Some of nodes cannot directly transmit packets to any sink node. Instead, the packets are first transmitted to intermediate or relay nodes, which then relay the packets to sink nodes. In other words, packet transmission is conducted in a multi-hop manner.

Some embodiments of the invention are based on realization that a multi-hop wireless network including multiple nodes with different computational and energy resources can be partitioned into a multiple subnetworks having a unique combination of objective functions and routing metrics. Moreover, the nodes of such a network can node join multiple subnetworks and can operate according to different MOPs specifying different types of routing for different subnetworks.

Figure 2B:
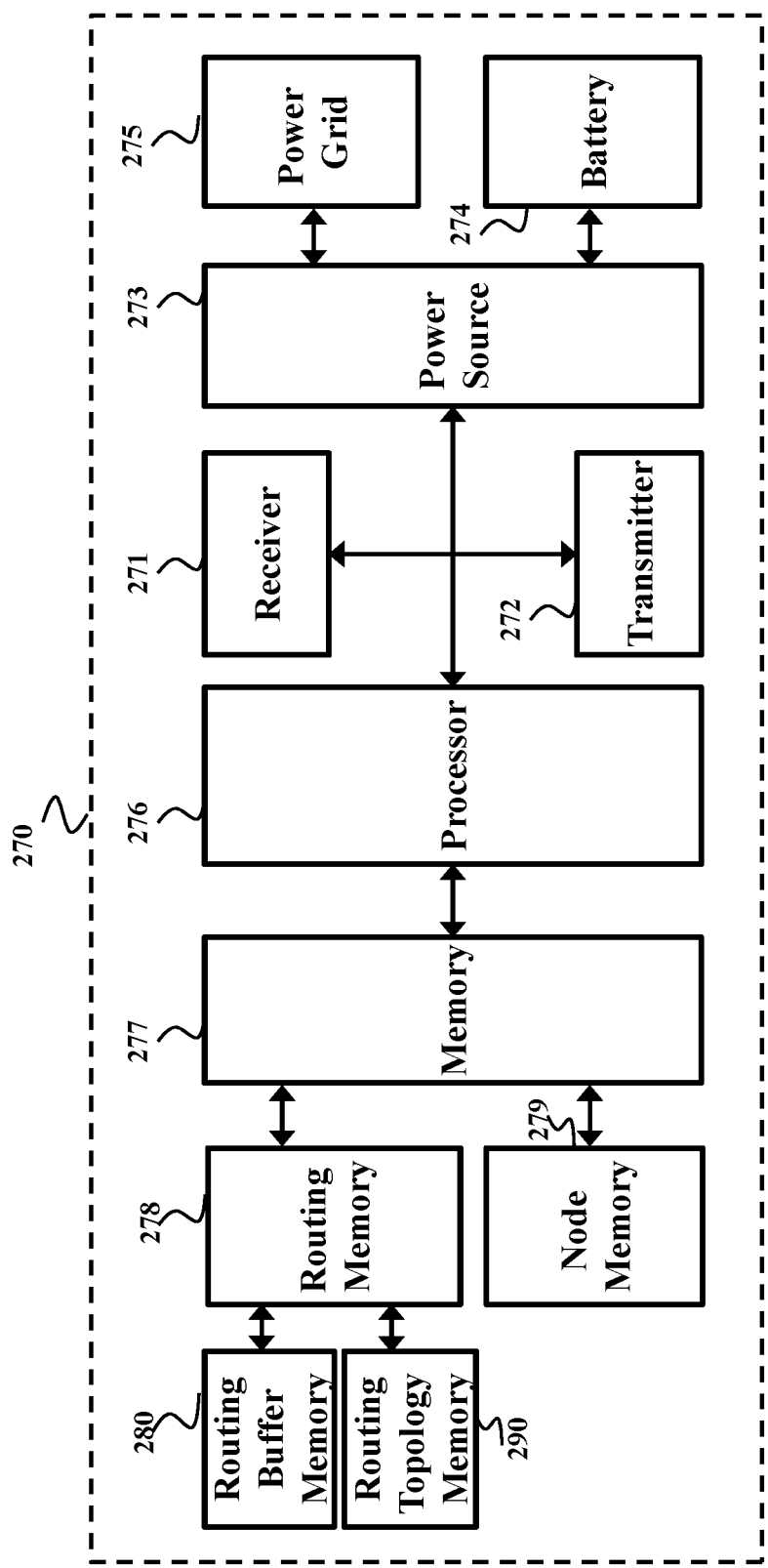
FIG. 2B is a schematic of a structure of a node participating in forming the network of FIG. 2A according to some embodiments of the invention.

FIG. 2B shows schematically a structure of the node 270 that can participate in forming the network of FIG. 2A. The node includes a transceiver for transmitting and receiving packets, such as data and control packets. The transceiver can include one or combination of a receiver 271 and a transmitter 272. The node can include a power source 273, such as battery 274 or power grid 275, for supplying energy to the node, a processor 276 and a memory 277, which is partitioned into two sections including routing memory section 278 and node memory section 279.

The processor 276 to join multiple subnetworks based on combinations of objective functions and routing metrics of the subnetworks and to determine different MOPs. The routing memory section 278 is further portioned into routing buffer memory 280 for buffering relay packets received by the node 270 and routing topology memory 290 for storing routing topology information such as route entries (i.e., routing table entries) and child-parent entries (i.e., source routing entries) for those nodes that use node 270 as router (i.e., relay node). The node memory 279 is used by the node 270 to join the network. Network information such as network identifier and identifier of the node 270 are stored into node memory 279. The node memory 279 is also used to buffer node's own packets.

To form network 200, each node 270 can perform some actions and store some information. For example, each node can receive route discovery packet and store sink node ID and next hop node ID to send its data packet towards the sink node. Sink node ID and next hop node ID are stored in node memory section 279. Nodes such as 260 may not have sufficient memory and power supply to relay packets for other nodes and can only join network as leaf node. Nodes such as 240 have sufficient power supply to relay route packets, but do not have sufficient routing topology memory 290 to store routing information for nodes in its sub-tree. Nodes such as 210 can perform all routing functions and store all routing information.

FIG. 2C shows a block diagram of a method for routing packets in a multi-hop heterogeneous wireless network partitioned into a set of subnetworks including a first subnetwork having a first sink node and a second subnetwork having a second sink node according to some embodiments of the invention, in which a node forms at least a part of the first subnetwork and at least a part of the second subnetwork. Steps of the method are performed using a processor 276 of the node.

The method determines 284 an available routing resource 285 of the node as a function of an allocated routing memory (ARM) in the node and a remaining expected routing lifetime (ERL) of the node. The ARM is a portion of the memory allocated by the node to run the routing protocol, and the ERL is the time the node can route packets, which can be govern, e.g., by a type of a battery of the node, and condition in which the node operates. Notably, in some embodiments, the available routing resource 285 is independent from the subnetworks of the node and is determined based on the parameters of the node itself.

The method also determines 281 at least one required routing resource of the node as a function of a routing protocol used by the node for a subnetwork, a logical location of the node in the subnetwork, and a data traffic in the subnetwork through the node. Notably, in some embodiments, the required routing resource 285 depends upon the subnetworks formed with the participation of the node. To that end, the node can determine different required routing resources. For example, the determining 281 includes determining a first required routing resource 282 of the node for the first subnetwork and determining a second required routing resource 283 of the node for the second subnetwork. The first required routing resource 282 can differ from the second required routing resource 283. For example, if the logical location of the node is closer to the first sink of the first subnetwork than to the second sink of the second network, the node can need to transfer more data for the first subnetwork than for the second subnetwork. To that end, the first required routing resource 282 can be larger than the second required routing resource 283.

The method determines 291, using the available routing resource 285 and the first required routing resource 282, a first MOP specifying a type of the routing of the node in the first subnetwork, and determines 293, using the available routing resource 285 and the second required routing resource 283, a second MOP specifying a type of the routing of the node in the second subnetwork. Due to the differences between the first and the second required routing resources, the first MOP can differ from the second MOP. Next, the method routes 295 packets in the first subnetwork according to the first MOP and routs packets in the second subnetwork according to the second MOP.

Some embodiments of the invention provide a hierarchical RPL (H-RPL) routing protocol for multi-hop heterogeneous wireless networks to achieve hierarchical routing based on node resources, such as allocated routing buffer memory 280, allocated routing topology memory 290, power source 273, etc., and sensed network conditions, such as sub-tree size, required routing memory, etc. As a result, H-RPL routing protocol organizes nodes in a network into hierarchical DODAG (H-DODAG) topology.

The sink node in H-DODAG topology is called the H-DODAG root. A H-DODAG is uniquely identified by three parameters: H-RPLInstanceID, H-DODAG ID and H-DODAG Version Number. The rank of a node in H-DODAG defines the individual position of the node relative to other nodes with respect to the H-DODAG root. H-RPL uses the H-DODAG Information Object (H-DIO) packet to construct upward routes from data nodes to the sink node. To build downward routes from the sink to data nodes, H-RPL uses H-DODAG Destination Advertisement Object (H-DAO) packet. The H-DODAG Information Solicitation (H-DIS) packet is used to solicit a H-DIO packet from a H-RPL node, that is, to discover new routes.

The differences of control packets between H-RPL and standard RPL include the following: (1) H-DIO carries heterogeneous objective functions, i.e., a set of objective functions that varies at different portion of network; (2) H-DIO carries set of one to many maps specifying routing metrics to be used for each objective function; (3) H-DIO carries a variable MOP instead of a fixed MOP; (4) H-DIO carries a sub H-DODAG ID; (5) the MOP has five encodings instead of four; (6) H-DAO carries MOP of corresponding target nodes; and (7) H-DIS can specify set of preferred objective functions and set of preferred routing metrics as well as preferred MOP.

A New Mode of Operation (MOP) and MOP Encodings

In H-DODAG topology, nodes use the MOP to announce their routing types. The MOPs defined by RPL do not satisfy requirements of heterogeneous networks. Therefore, besides MOP=0, MOP=1, MOP=2 and MOP=3 defined in RPL, the embodiments of the invention defines a new MOP for H-DODAG, i.e., MOP=−1. With MOP=−1, a node signals that one or combination of its resources is so critical so that the node cannot perform routing any more. Instead, the available resources can only allow the node to transmit its own packets. With the introduction of new MOP=−1, the MOP takes 4 bits.

In H-DODAG topology, MOP=−1 is referred as leaf MOP; MOP=0 is referred as upward MOP; MOP=1 is referred as non-storing MOP; MOP=2 is referred as storing MOP; and MOP=3 is referred as multicast storing MOP.

The nodes in the H-DODAG operate according to different MOPs specifying types of routing. The node operating according to the leaf MOP can be a leaf node and therefore, cannot extend network connectivity, i.e., does not transmit regular H-DIO packet. The node operating according to the upward MOP does not route downward packet. The node operating according to the non-storing MOP does not store downward routing information. The node operating according to the storing MOP stores the downward routing information such as route entries, child-parent entries specifying child-parent pairs for at least part of the network, and K-Hop neighbor information. The node operating according to the multicast storing MOP stores the downward routing information and downward multicast information such as members of a multicast group.

The node operating on MOP=−1, 0, 1 is referred herein as a non-storing node. The node operating on MOP=2, 3 is referred herein as a storing node. With MOP=−1, 0 and 1, nodes send H-DAO to the sink node by including parent information in the H-DAO, which is referred as non-storing H-DAO (N-H-DAO). With MOP=2 and 3, nodes sends H-DAO to parents without including parent information in the H-DAO, which is referred as storing H-DAO (S-H-DAO).

Mode of Operation (MOP) Determination and Modification

To construct a H-DODAG topology, a node in network 200 needs to determine an appropriate MOP. For this purpose, some embodiments of the invention use two new parameters to compute MOP. The first parameter is required routing memory (RRM), which is required to store route entries 310, child-parent entries 320, K-HOP neighbor entries 330, and buffer relay packets, etc. The RRM is different from allocated routing memory (ARM) 278. The RRM is important in determining MOP because as shown in FIG. 1B, with same ARM, a node with a smaller sub-tree can store all routing information such as route entries and child-parent entries, a node with a larger sub-tree, however, cannot store all routing data. The second parameter is expected routing lifetime, which indicates time a node can perform routing. When routing lifetime is critical, a node can only act as a leaf node. In network 200, nodes have different power sources and different battery capacities. A node with grid power source is considered to have infinite routing lifetime. However, a node with battery power source has finite routing lifetime. Due to battery capacity variation, conventional measurements such as percentage of remaining energy is meaningless because with same percentage of remaining energy, a node with big battery capacity can route longer than a node with small battery capacity. In addition, nodes may perform different role in network 200. A router consumes more energy than a leaf node. With same amount of battery energy, a heavy workload node lives shorter than a light workload node does. Therefore, conventional residual energy measurement may not indicate lifetime of a node.

To join a H-DODAG topology, a node can have enough node memory 279, which is the memory required by a node to operate. The node memory is different from routing memory 278, which is additional memory required by a node to perform additional role as router. In H-DODAG topology, the required node memory (RNM) can be computed as $$RNM = N_P * \{|\text{Parent } ID| + |\text{Parent } MOP| + |\text{Default Lifetime}| + \quad (1)$$
$$|\text{Lifetime Unit}|\} + |H - RPLInstanceID| +$$
$$|H - DODAG\ ID| + |H - DODAG\ \text{Version Number}| +$$
$$|Sub\ H - DODAG\ ID| + |\text{Node } MOP| +$$
$$|\text{Node Buffer}| + other\_required\_node\_memory$$

where $N_P$ is number of parents, Parent ID is 16 bytes, Default Lifetime is 1 byte, Lifetime Unit is 2 bytes, Parent MOP is 0.5 byte, H-RPLInstanceID is 1 byte, H-DODAG ID is 16 bytes, H-DODAG Version Number is 1 byte, Sub H-DODAG ID is 16 bytes and Node MOP is 0.5 byte, and node buffer size depends on packet generation rate of the node. Therefore, the minimum RNM ($RNM^{min}$) is at least 54+node_buffer_size+other_required_node_memory bytes, which is only for 1 parent.

Equation (1) indicates that the $RNM^{min}$ is node dependent. If a node selects more parents or generates more packets, the $RNM^{min}$ is bigger. Otherwise, the $RNM^{min}$ is smaller.

Required Routing Memory (RRM) Computation

The approach to compute RRM is same for all routing algorithms. However, the RRM computed varies based on specific routing algorithm because different routing algorithms store different routing information. The embodiments of the invention provide a method to compute RRM for H-RPL routing protocol. There are four types of routers in H-RPL: upward router, non-storing router, storing router and multicast storing router. For a node in H-DODAG topology to be upward router, the node needs to transmit regular H-DIO packet. Therefore, the node needs to maintain three Trickle Timer configuration parameters: the H-DIO interval minimum (1 byte), the H-DIO interval doublings (1 byte) and H-DIO redundancy constant (1 byte). In addition, the node also needs to maintain three Trickle Timer variables: the current interval size I (4 bytes), a time T (4 bytes) within current interval and a counter C (1 byte). In addition, an upward router also needs to maintain a set of objective functions and a set of routing metrics as well as one to many mappings between objective function and routing metrics. An objective function is identified by an objective code point (OCP), which is 1 byte, and a routing metric (RM) is at least 1 byte. An upward router also needs to maintain parent rank (2 bytes), node rank (2 bytes), MaxRankIncrease (2 bytes) and MinHopRankIncrease (2 bytes). However, an upward router does not route downward packets and therefore, does not maintain destination advertisement trigger sequence number (DTSN). As a result, the required routing memory for an upward router ($RRM_U$) is given by $$RRM_U = |H - DIO\ \text{Interval Min}| + |H - DIO\ \text{Interval Doublings}| + \quad (2)$$
$$|H - DIO\ \text{Redundancy Constant}| + |I| + |C| + N_{OCP} * |OCP| +$$

$$N_{RM} *|RM| + |OCP \text{ to } RMs \text{ Mappings}| + N_P *|\text{Parent Rank}| +$$
$$|\text{Node Rank}| + |MaxRankIncrease| + |MinHopRankIncrease| +$$
$$|\text{Upward Routing Buffer}| + \text{other\_required\_routing\_memory}$$

where $N_{OCP}$ is number of objective functions, $N_{RM}$ is number of routing metrics. Therefore, the minimum RRM for an upward router ($RRM_U^{min}$) is at least 22+upward_routing_buffer_size+other_required_routing_memory bytes, which is for 1 objective function, 1 routing metric and 1 parent.

For a non-storing router, besides routing memory required by upward router, additional routing memory is needed for maintaining DTSN (1 byte) and buffering downward packets. Therefore, the required routing memory for a non-storing router ($RRM_N$) is given by $$RRM_N = RRM_U + N_P *|\text{Parent DTSN}| + |\text{Downward Routing Buffer}| + |\text{other\_required\_routing\_memory}| \quad (3)$$

The minimum RRM for a non-storing router ($RRM_N^{min}$) is at least 23+upward_routing_buffer_size+downward_routing_buffer_size+other_required_routing_memory bytes, which is for 1 objective function, 1 routing metric and 1 parent.

For a node to be a storing router, besides routing memory required by non-storing router, additional routing memory is required to store route entries, child-parent entries and K-Hop neighbor information. The K-Hop neighbor of a node is defined as the node that is within K hop neighborhood of the node. A storing router computes size of its routing table by counting number of destinations contained in both N-DAO and S-H-DAO packets sent or forwarded by its storing children. A storing router computes size of its child-parent database by counting number of destinations contained in N-H-DAO packets sent or forwarded by its non-storing children. A storing router computes number of K-Hop neighbors by broadcasting a K-Hop neighbor request packet and counting number of K-Hop neighbors contained in response packets. A storing router determines value of K based on its preference. If K=1, K-Hop neighbor set and neighbor set are same. If K>1, neighbor set is a sub-set of K-Hop neighbor set.

Figure 4:
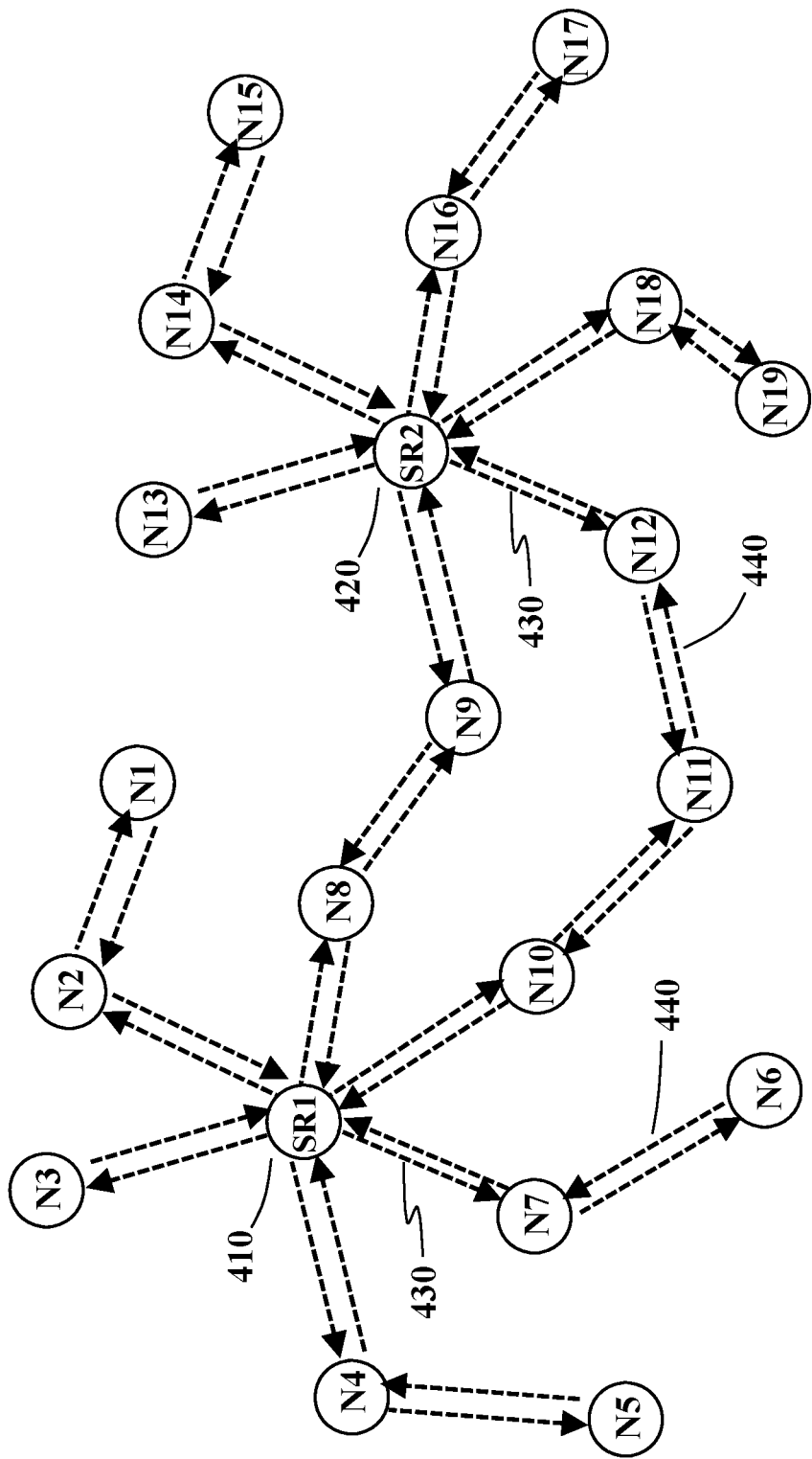
FIG. 4 is an example of 2-hop neighbor request and response packet transmission according to some embodiments of the invention.

FIG. 4 shows an example of 2-Hop neighbor request and neighbor response process, in which a storing router (SR) 410 and 420 broadcast 2-Hop neighbor request packet 430 and neighbors within 2 hops respond with a neighbor response packet 440. The neighbor request packet and neighbor response packet are relayed by 1-hop neighbors. Some nodes such as N1 and N2 only receive 2-Hop neighbor requests 430 from one storing router 410. However, some nodes such as N8, N9 and N11 receive 2-Hop neighbor request 430 from both storing router 410 and 420. In this case, these nodes can send their first and second routing preferences to the first and second storing routers, respectively. Nodes select the first and second storing routers based on their preferences. For example, a node may select the first storing router with smaller hop count and the second storing router with larger hop count.

Figure 3A:
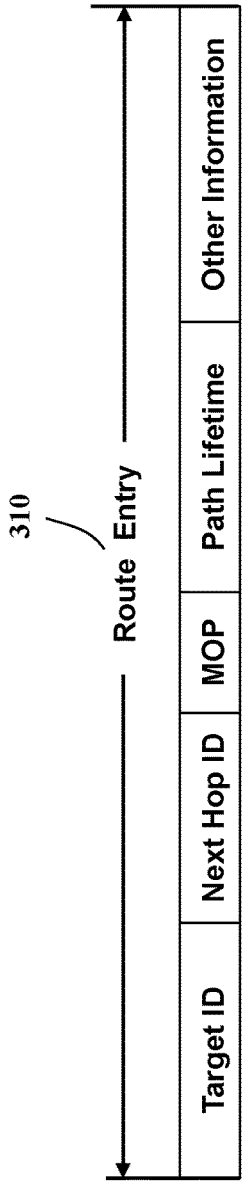
FIG. 3A is an example format of routing table entry according to some embodiments of the invention.
Figure 3B:
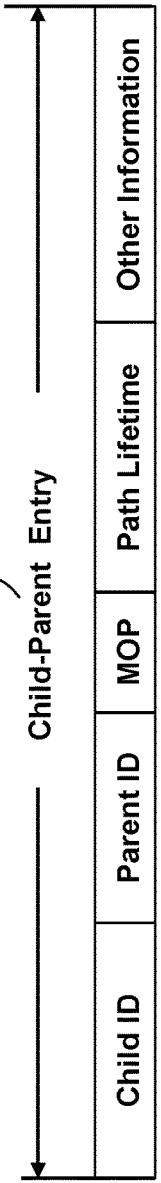
FIG. 3B is a format of a source routing entry according to some embodiments of the invention.
Figure 3C:
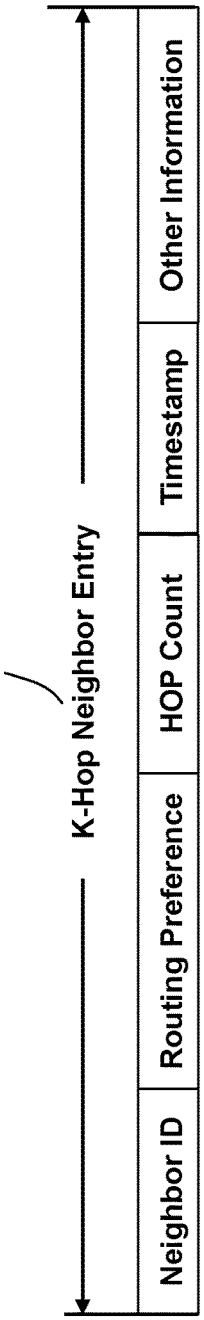
FIG. 3C is a format of K-Hop neighbor entry according to some embodiments of the invention.

Assume a storing router has $N_R$ entries in its routing table, $N_C$ entries in its child-parent database and $N_K$ K-Hop neighbors. The RRM for a storing router ($RRM_S$) is given by $$RRM_S = RRM_N + N_R *|\text{Route Entry}| + N_C *|\text{Child-Parent Entry}| + N_K *|\text{K-Hop Neighbor Entry}| + \text{other\_require\_routing\_memory} \quad (4)$$

where format of Route Entry is shown in FIG. 3A, Target ID is 16 bytes, next hop ID is 16 bytes, MOP is 0.5 byte and Path Lifetime is 1 byte. Therefore, the minimum size of a Route Entry is 33.5 bytes. Format of Child-Parent Entry is shown in FIG. 3B and the minimum size is also 33.5 bytes. Format of K-Hop Neighbor Entry is shown in FIG. 3C. Neighbor ID is 16 bytes, Routing Preference is 1 byte, Hop Count is 1 byte, and timestamp is 4 bytes. The minimum size of a K-Hop Neighbor Entry is 22 bytes. To be a storing router, a node needs to have at least 1 parent, store at least one route entry or child-parent entry and at least 2 K-Hop neighbors. Therefore, the minimum routing memory for a storing router ($RRM_S^{min}$) is at least 100.5+upward_routing_buffer_size+downward_routing_buffer_size+other_required_routing_memory bytes.

For a multicast storing router to support downward multicast, besides required routing memory $RRM_S$, the node needs additional multicast memory, which is required to operate downward multicast such as storing members of the multicast groups. Therefore, the RRM for a storing router with multicast support ($RRM_M$) is given by $$RRM_M = RRM_S + |\text{Downward Multicast Memory}| + \text{other\_require\_routing\_memory} \quad (5)$$

The minimum routing memory for a storing router with multicast support ($RRM_M^{min}$) is at least 100.5+upward_routing_buffer_size+downward_routing_buffer_size+downward_multicast_memory+other_required_routing_memory bytes.

Equations (2)-(4) show that thresholds $RRM_U^{min}$, $RRM_N^{min}$, $RRM_S^{min}$ and $RRM_M^{min}$ are node dependent. For example, if a node selects more parents or has a larger sub-tree, these thresholds are bigger. Also, the bidirectional routing needs more memory than unidirectional routing.

Using computed thresholds $RRM_U^{min}$, $RRM_N^{min}$, $RRM_S^{min}$, $RRM_M^{min}$ and allocated routing memory (ARM), a node can determine its MOP as follows:

$$MOP = \begin{cases} -1, & \text{if } ARM < RRM_U^{min} \\ 0, & \text{if } RRM_U^{min} \le ARM < RRM_N^{min} \\ 1, & \text{if } RRM_N^{min} \le ARM < RRM_S^{min} \\ 2, & \text{if } RRM_S^{min} \le ARM < RRM_M^{min} \\ 3, & \text{if } ARM \ge RRM_M^{min} \end{cases} \quad (6)$$

This MOP calculation method can be used if a node is mains powered or the expected routing lifetime is not available.

Expected Routing Lifetime Computation

A node consumes energy on routing by receiving relay packets and transmits relay packets. A mains powered node has unlimited power supply and therefore, has an unlimited routing lifetime. On the other hand, a battery powered node has limited power supply. When a node's battery level is low, it is desirable to stop routing functions. In this way, a battery node can use remaining energy to transmit its own packets. This approach prolongs network lifetime and avoids dead nodes. Following is a method provided to compute the expected routing lifetime (ERL).

For a mains powered node, if the node has parents, i.e., size of parent set (PS) is greater than 0, then the node is considered to have infinite routing lifetime, and if the node does not have parent, the node cannot route packet. As a result, the node is considered to have no routing lifetime. Therefore, the ERL of a mains powered node is defined as $$ERL = \begin{cases} \text{Infinite Routing Lifetime}, & \text{if } |PS| > 0 \\ 0, & \text{if } |PS| = 0 \end{cases} \quad (7)$$

To compute expected routing lifetime for a battery powered node, assume $E_i$ is residual energy at time $t_i$ (i=0, 1, 2, ... ) with $E_0$ being initial energy, $R_{TX}$ is transmission power consumption, $P_{RX}$ is receiving power consumption, $NR_i$ is number of relay packets received from time $t_{i-1}$ to time $t_i$ and $NT_i$ is number of relay packets transmitted from time $t_{i-1}$ to $t_i$. Then, the expected routing lifetime at time $t_i$ ($ERL_i$) is estimated as $$ERL_i = \frac{(t_i - t_{i-1}) * E_i * (NR_i * P_{RX} + ETX * NT_i * P_{TX})}{NR_i * (E_{i-1} - E_i) * (P_{RX} + ETX * P_{TX})} \quad (8)$$

Therefore, the ERL for a battery powered node at time $t_i$ is defined as $$ERL = \begin{cases} ERL_i, & \text{if } |PS| > 0 \\ 0, & \text{if } |PS| = 0 \end{cases} \quad (9)$$

Define four thresholds $ERL_U^{min}$, $ERL_N^{min}$, $ERL_S^{min}$ and $ERL_M^{min}$ for expected routing time such that $ERL_U^{min} < ERL_N^{min} < ERL_S^{min} < ERL_M^{min}$, where $ERL_U^{min}$ is the minimum routing lifetime required for an upward router, $ERL_N^{min}$ is the minimum routing lifetime required for a non-storing router, $ERL_S^{min}$ is the minimum routing lifetime required for a storing router and $ERL_M^{min}$ is the minimum routing lifetime required for a storing router to support downward multicast. Based on expected routing lifetime (ERL) computed, a node can determine its MOP as follows:

$$MOP = \begin{cases} -1, & \text{if } ERL < ERL_U^{min} \\ 0, & \text{if } ERL_U^{min} \le ERL < ERL_N^{min} \\ 1, & ERL_N^{min} \le ERL < ERL_S^{min} \\ 2, & \text{if } ERL_S^{min} \le ERL < ERL_M^{min} \\ 3, & \text{if } ERL \ge ERL_M^{min} \end{cases} \quad (10)$$

This MOP calculation can be used when a node has unlimited routing memory allocated or required routing memory is not available. Equation (10) shows that if a battery powered node has $ERL < ERL_U$, the node does not route packet any more. Instead, it uses remaining energy to transmit its own packets.

Combing equations (6) and (10), the MOP computation for a node in network 200 is defined as $$MOP = \begin{cases} -1, & \text{if } ERL < ERL_U^{min} \text{ or } ARM < RRM_U^{min} \\ 0, & \text{if } ERL_U^{min} \le ERL < ERL_N^{min} \text{ and } RRM_U^{min} \le ARM \\ 0, & \text{if } ERL_U^{min} \le ERL \text{ and } RRM_U^{min} \le ARM < RRM_N^{min} \\ 1, & \text{if } ERL_N^{min} \le ERL < ERL_S^{min} \text{ and } RRM_N^{min} \le ARM \\ 1, & \text{if } ERL_N^{min} \le ERL \text{ and } RRM_N^{min} \le ARM < RRM_S^{min} \\ 2, & \text{if } ERL_S^{min} \le ERL < ERL_M^{min} \text{ and } RRM_S^{min} \le ARM \\ 2, & \text{if } ERL_S^{min} \le ERL \text{ and } RRM_S^{min} \le ARM < RRM_M^{min} \\ 3, & \text{if } ERL \ge ERL_M^{min} \text{ and } ARM \ge RRM_M^{min} \end{cases} \quad (11)$$

Figure 5:
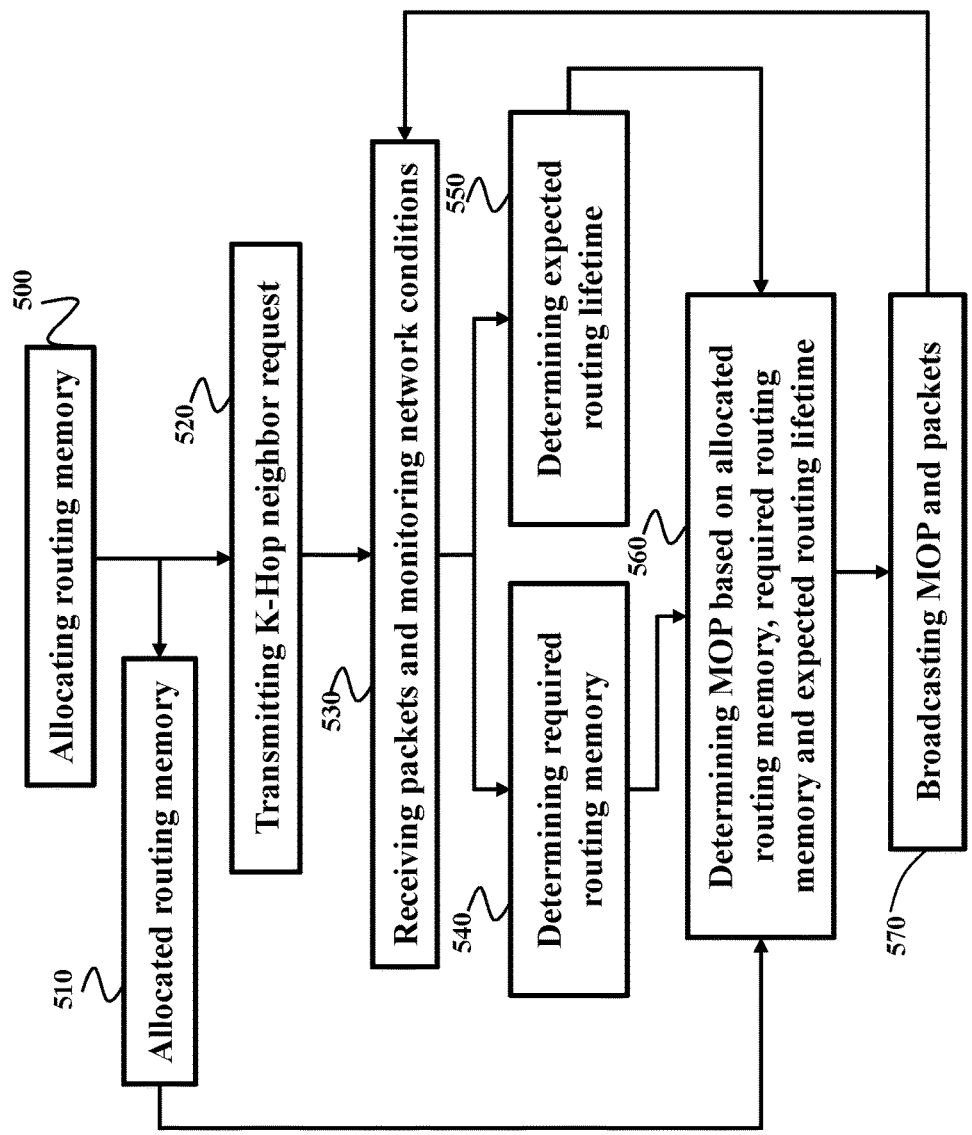
FIG. 5 is a block diagram of a method for modifying a mode of operation (MOP) of the node according to some embodiments of the invention.

FIG. 5 shows a block diagram of a method for determining and/or modifying the MOP of the node according to one embodiment of the invention. A node first 500 allocates routing memory 278. Once routing memory 510 is allocated, the potential storing node, i.e., the node with allocated routing memory (ARM) 510 greater than or equal to $RRM_S^{min}$, transmits K-Hop neighbor request packet. Node then starts receiving K-Hop neighbor response packets and other network topology packets such as H-DIO and H-DAO. Based on received packets, the node can 540 determine required routing memory (RRM) using equation (2), (3), (4) or (5) and can also determine 550 the expected routing lifetime using equation (7) or (9). Based on allocated routing memory (ARM), required routing memory (RRM) and the expected routing lifetime (ERL), the node can determine 560 its MOP using equation (11). Once a new MOP is computed, the node transmits 570 the new MOP and necessary topology packets to let its neighbor know its routing type and updated information. The node then goes back to receive packets and monitor network conditions, and modified MOP if it is necessary.

Because nodes in the network 200 signal various routing types by using different MOPs computed based on allocated routing memory, required routing memory and expected routing lifetime, some embodiments use a resource aware multi-task routing to route packets from data nodes to the sinks and from the sinks to data nodes. Some embodiments of the invention adapt H-RPL protocol for the resource aware multi-task routing.

Hierarchical DODAG (H-DODAG) Construction

Figure 6:
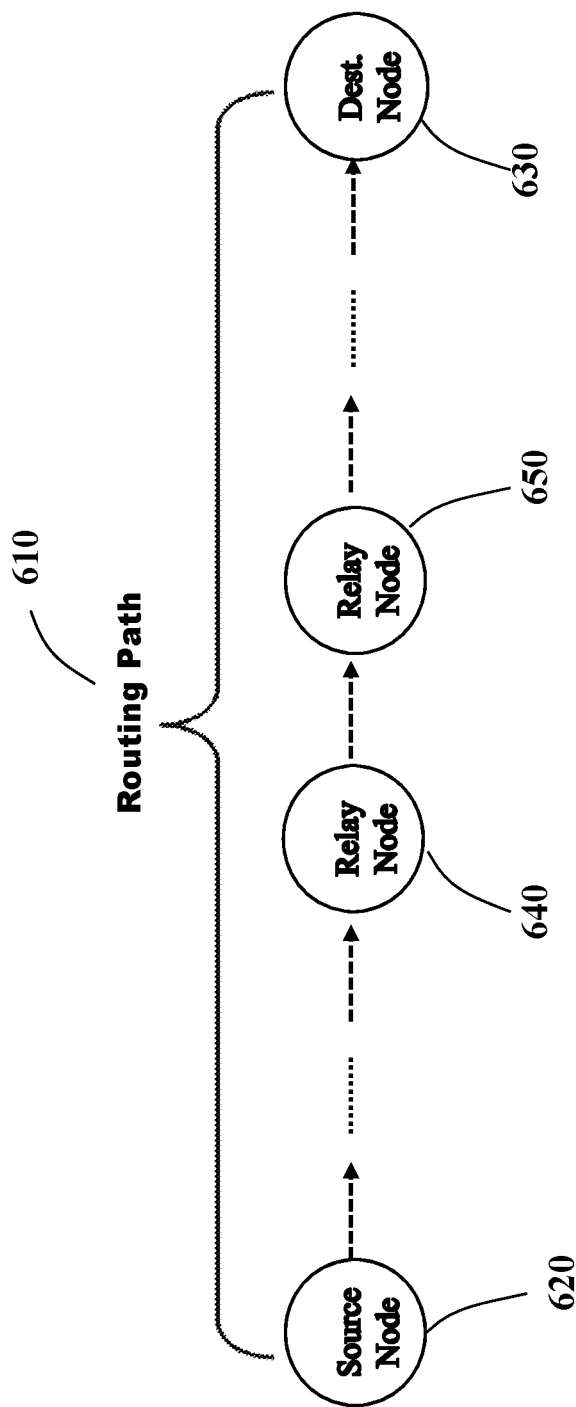
FIG. 6 is an example of routing path from a source to destination node via a plurality of intermediate relay nodes according to some embodiments of the invention.

The parent of a node is defined as an immediate successor of the node on a path towards the sink node. The child of a node is defined as an immediate predecessor of the node on a path towards the sink node. FIG. 6 shows an example of routing path 610 from source node 620 to destination node 630, in which relay node 650 is parent of relay node 640 and relay node 640 is child of relay node 650.

Some embodiments of the invention are based on recognition that nodes should perform its routing in consideration of its own resources and the resources of other nodes as indicated by their MOPs. In addition, some embodiments are based on a realization that nodes join network hierarchy in consideration of its own MOP and MOPs of its neighbors. Some embodiments of the invention are based on recognition that network hierarchy is built based on a set of objective functions and a set of routing metrics, nodes selects appropriate objective function and routing metrics in considering of its own resources and its neighbor's resources.

Figure 7:
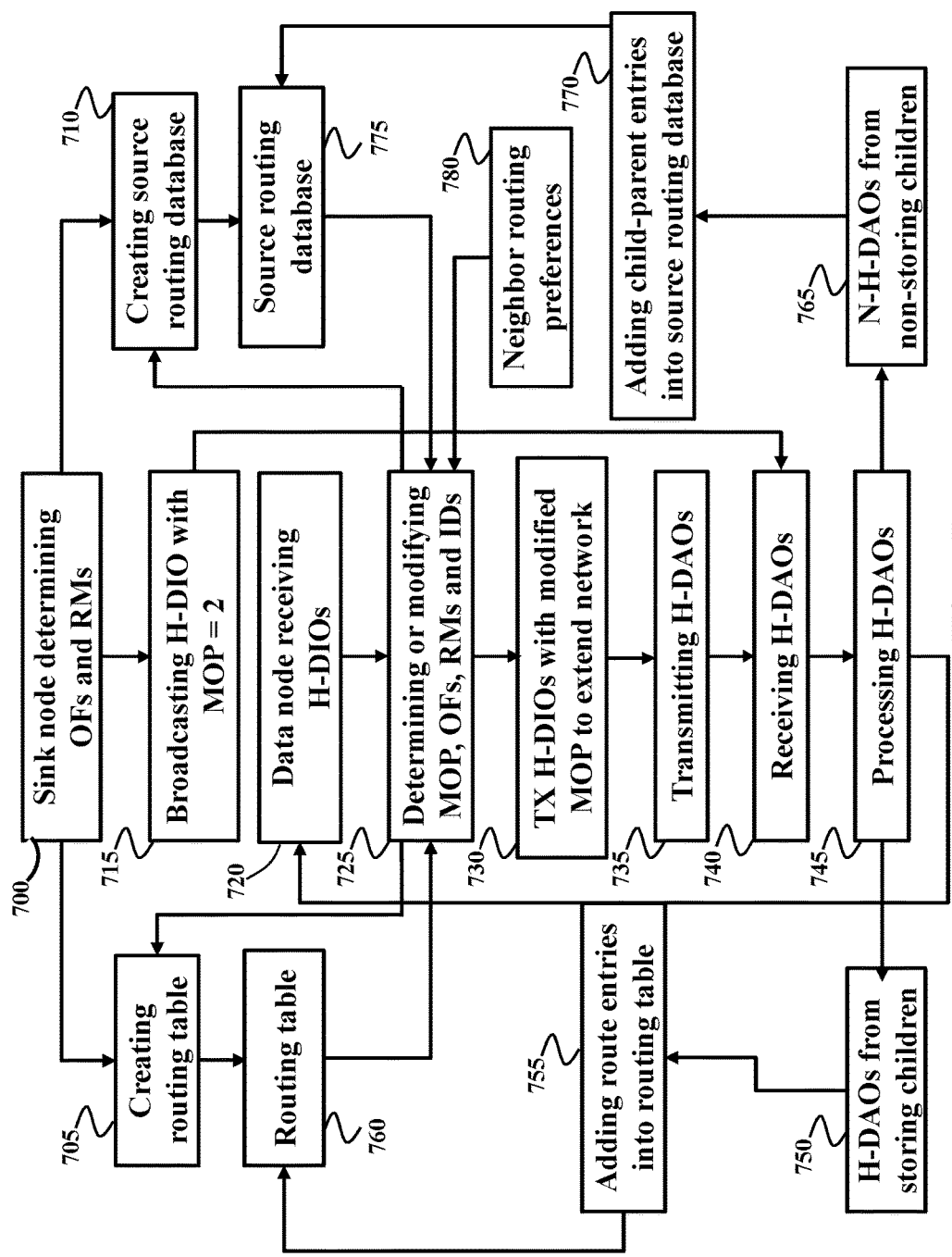
FIG. 7 is a block diagram of a method for constructing a hierarchical destination oriented directed acyclic graph (H-DODAG) using sets of objective functions and sets of routing metrics according to some embodiments of the invention.

FIG. 7 shows block diagram to build resource aware multi-task hierarchical DODAG (H-DODAG) according to one embodiment of the invention. Sink node starts H-DODAG construction by broadcasting H-DIO packet. Unlike standard DODAG construction, sink node determines 700 set of objective functions (OFs) and a set of routing metrics (RMs) to be included in H-DIO. Sink node specifies a set of routing metrics to be used for each objective function. For example, sink node selects two objective functions OF1 and OF2 and three routing metrics RM1, RM2 and RM3, and groups OFs and RMs into two sets (OF1, RM1, RM2) and (OF2, RM2, RM3). As a result, RM1 and RM2 are primary and secondary routing metrics of OF1, respectively, and RM2 and RM3 are primary and secondary routing metrics of OF2, respectively. By default, set (OF1, RM1, RM2) is used to construct the first tier H-DODAG topology and set (OF2, RM2, RM3) is used to construct the second tier H-DODAG topology. Sink node selects set (OF1, RM1, RM2) based on overall network consideration and selects set (OF2, RM2, RM3) based on routing preference information collected in K-Hop neighbor request and response process. Besides H-DODAG ID, sink node also includes a sub H-DODAG ID with both set to its IPv6 address. By default, sink node sets MOP=2 even though other values can be used. Sink node creates 705 a routing table 760 and creates 710 a source routing database (child-parent database) 775, which will be used in H-DAO packet receiving and processing. Sink node then broadcasts 715 the H-DIO packet with MOP set to 2. After transmitting H-DIO packet, sink node goes to receive 740 H-DAO packets and processes 745 H-DAO packets. For N-H-DAO or S-H-DAO packets 750 sent or forward by storing children, sink node adds 755 route entries into routing table 760. For N-H-DAO packets 765 sent or forwarded by non-storing children, sink node adds 770 child-parent entries into source routing database 775.

Once sink node initiates H-DODAG construction, data nodes propagate H-DIO packet to extend network topology. When a data node receives 720 H-DIO packets, the node processes packets to obtain set of objective functions, set of routing metrics, set of one to many maps between objective function and routing metrics, and MOP values received contained in H-DIO packets. The node also obtains the H-DODAG ID and sub H-DODAG ID. The data node determines 725 its MOP value. A storing node creates 705 routing table 760 and creates 710 source routing database 775. The storing data node may use routing table 760 and source routing database 775 to modify 725 its MOP. The storing data node may also use neighbor routing preferences 780 to modify 725 set of objective functions and set of routing metrics. If the data node's MOP=−1, the node selects a set of parents using the second set of (OF, RMs) included received H-DIOs. It is possible that the second set (OF, RMs) is different in different H-DIO from different node. The node then selects a default parent and constructs an N-H-DAO 765 including its MOP and forwards 735 the N-H-DAO to the default parent. Because a node with MOP=−1 can be a lead node, the node does not transmits H-DIO packet. If the data node's MOP=0 or 1, the node selects a set of parents using the second set of (OF, RMs) included received H-DIOs. If no storing parent, the node selects one non-storing parent as default parent and computes its rank by using second set of (OF, RMs) received from default parent. Otherwise, the node selects one storing parent as default parent and computes its rank by using second set of (OF, RMs) received from default parent. Unlike the standard RPL, where each router transmits one DIO packet, for each parent selected, the node stores corresponding sub H-DODAG ID and transmits 730 an H-DIO packet including node's MOP and the sets of (OF, RMs) received. Finally, the node constructs an N-H-DAO 765 including its MOP and forwards 735 the N-H-DAO to default parent. If the data node's MOP=2 or 3, the node first selects a set of parents using the first set of (OF, RMs) included received H-DIOs. If no such parents, i.e., the node received H-DIOs from non-storing nodes only, then the node selects a set of parents using the second set of (OF, RMs). Even if the node has selected storing parent, the node can still select a set of non-storing parents as backup parents by using the second set of (OF, RMs). If the node has at least one storing parent, the node selects a storing parent as default parent. In this case, the node computes its rank using the first set of (OF, RMs) received from default parent. For each parent selected, the node transmits 730 an H-DIO packet by setting MOP=2 or 3 in H-DIO packet. The most importantly, the replaces sub H-DODAG ID with its IPv6 address and the node can replace 725 the second set of (OF, RMs) by using information collected from K-Hop neighbor response packets, which show the routing preferences of K-Hop neighbors. The node creates 705 a routing table 760 and creates 710 a source routing database 775. The node sends one S-H-DAO 750 packet to each of storing H-DAO parent and forwards one N-H-DAO 765 packet to one of non-storing parents if any non-storing parent has been selected as H-DAO parent. If no storing parent has been selected, the node computes its rank by using second set of (OF, RMs) received from default parent. The node then transmits 730 H-DIO packet by setting MOP=1. In this case, the storing node acts as a non-storing node and does not create routing table and source routing database. Therefore, the node is called as acting non-storing node. This MOP degrade is to avoid data packet congestion because the node is surrounded by non-storing neighbors, if the node announces a storing MOP, all neighbors will forward their packets to the node, but the node actually has a non-storing default parent, which does not have a large buffer to store more packets or does not have more power supply to relay more packets. The node forwards 735 one N-H-DAO to default parent.

During H-DODAG construction process, besides receiving and processing H-DIO packets, data nodes also receive and process H-DAO packets, which are used to build downward routes from the sink node to data nodes. The leaf nodes should not receive any H-DAO packet. The non-storing nodes and the acting non-storing nodes should only receive 740 N-H-DAO 765. These nodes do not process the received N-H-DAO packets and only relay N-H-DAO packets to their default parents. Storing data nodes process 745 the received H-DAO packets by adding 755 a route entry into routing table 760 for each target contained in N-H-DAO or S-H-DAO 750 packets sent or forwarded by storing children and adding 770 a child-parent entry into source routing database 775 for each target contained in N-H-DAO 765 packets sent or forwarded by non-storing children. The sink node uses H-DAO packets to compute network size, i.e., H-DODAG size. The storing node uses H-DAO packets to compute sub-network size, i.e., sub-H-DODAG size.

Acting non-storing node can build its own sub-DODAG if the node has more processing power to perform data aggregation and multiple communication interfaces.

Figure 8:
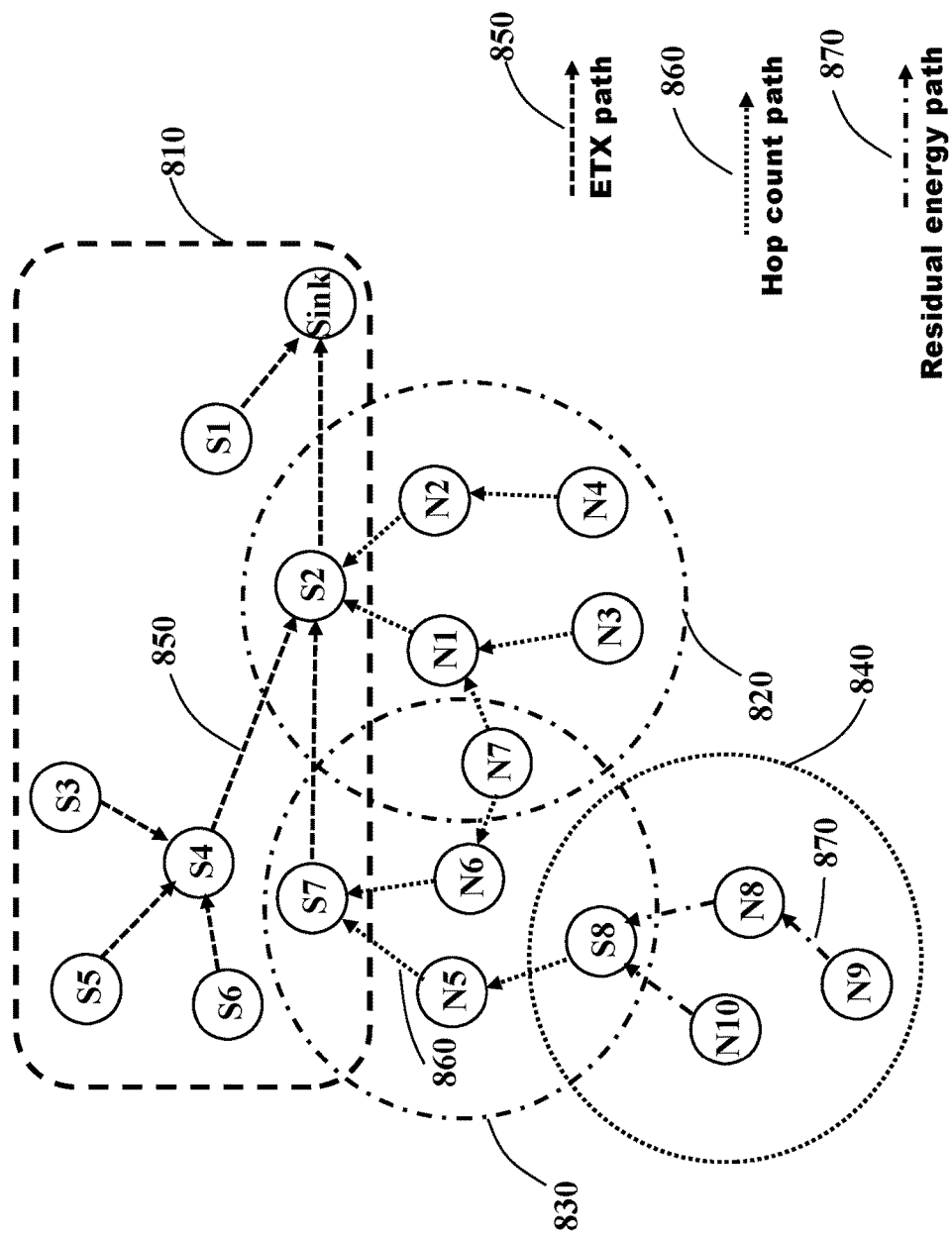
FIG. 8 is an example of a hierarchical destination oriented directed acyclic graph (H-DODAG) using three sets of routing metrics according to some embodiments of the invention.

FIG. 8 shows an example of H-DODAG topology partitioned into a set of subnetworks. The sink node specifies the maximum packet delivery rate and high throughput metric expected transmission count (ETX) 850 as primary set of objective function and routing metric, and the minimum packet delay and hop count as secondary set of objective function and routing metric. The first subnetwork H-DODAG 810 is formed by sink node, storing nodes S1 to S7. The ETX 850 is used by storing nodes S1 to S7 to achieve high throughput. Hop count metric 860 is used by non-storing nodes N1 to N7. The second subnetwork H-DODAG 820 is formed by storing node S2 and non-storing nodes N1, N2, N3, N4 and N7, where S2 is called sub H-DODAG root. The second subnetwork H-DODAG 830 is formed by storing node S7 and non-storing nodes N5, N6, N7 and the acting non-storing node S8, where S7 is the sub H-DODAG root. The hop count metric 860 is used by non-storing nodes N5, N6, N7 and the acting non-storing node S8. In this example, the non-storing node N7 joins two sub H-DODAGs 802 and 830 by selecting two parents N1 and N6. The third subnetwork H-DODAG 840 is formed by the acting non-storing node S8 and non-storing battery nodes N8, N9 and N10, where the acting non-storing node S8 is sub H-DODAG root. Based on routing preference of nodes N8, N9 and N10, the acting non-storing node replaces the second set of objective function and routing metric (the minimum packet delay, hop count) with (the maximum network lifetime, residual energy metric 870).

Different nodes can belong to one subnetwork, e.g., a node N4, or to multiple subnetworks, e.g., a node N7. To that end the node N7 can rout packets to a sink S7 of the subnetworks 830 and to the sink S2 of the subnetwork 820.

According to various embodiments of the invention, a data node in an H-DODAG topology selects multiple parents to connect to multiple sub H-DODAGs, i.e., subnetworks. A sub H-DODAG root is the sink node or a storing node, to which all nodes in the sub H-DODAG have routes. A node stores the sub H-DODAG root ID corresponding to each parent.

Hierarchical DODAG (H-DODAG) Maintenance

Based on resource usage and sensed network conditions, a node in network 200 may change its MOP. A node may also leave network due to failure or shortage of resources. The neighboring nodes need to adjust their functions adaptively.

FIG. 9A shows changes that can cause a node to decrease 900 its MOP. The changes include required resource increase 910, storing parent MOP decrease 920, storing parent unavailability 930, and node resource decrease 940. FIG. 9B shows changes that can cause a node to increase 950 its MOP. The changes include required resource decrease 960, non-storing parent MOP increase 970, leaf neighbor MOP increase 980, and node resource increase 990.

The following paragraphs describe H-DODAG maintenance in H-RPL routing protocol.

If a non-storing backup parent becomes unreachable, the node may discover new parents using DIS packet. If non-storing default parent becomes unreachable, the node selects a new default parent, computes new rank and transmits H-DIO packet to show the change. The node may also discover new parents.

If a storing backup parent becomes unreachable, the node may discover new parents. If storing default parent becomes unreachable, the node selects a backup storing parent as default parent if the node has at least one backup storing parent. The node then computes new rank and transmits H-DIO packet without changing its MOP. If the node has no backup storing parent and the node is a non-storing node, the node selects a non-storing parent as default parent, computes new rank and transmits H-DIO packet without changing its MOP. However, if the node has no backup storing parent and the node is a storing node, the node can degrade its MOP to 1 to become an acting non-storing node, selects a non-storing parent as default parent, computes new rank and transmits a H-DIO packet with new MOP=1. In each case, the node may discover new parents.

If a backup storing parent changes its MOP to −1, the child node can remove this parent from its parent set and discover new parents if necessary. If a backup storing parent changes its MOP to 0 or 1, the child node updates parent MOP accordingly. If the storing default parent changes its MOP to −1, the child node can remove this parent from its parent set. If the node has at least one backup storing parent, the node selects a backup storing parent as default parent, computes new rank and transmits H-DIO without changing its MOP. If the node has no backup storing backup parent, the node selects a non-storing parent as default parent, computes new rank. If the node is non-storing node, the node transmits H-DIO without changing its MOP. However, if the node is storing node, the node can change its MOP to 1 and transmits H-DIO with MOP=1. If the storing default parent changes its MOP to 0 or 1 and the child node has at least one backup storing parent, the node selects a backup storing parent as default parent, computes new rank and transmits H-DIO without changing its MOP. If the storing default parent changes MOP to 0 or 1 and the child node has no backup storing parent, the node selects a non-storing parent as default parent, computes new rank. If the node is non-storing node, the node transmits H-DIO without changing its MOP. However, if the node is storing node, the node can change its MOP to 1 and transmits H-DIO with MOP=1.

If a non-storing backup parent changes its MOP to −1, the child node can remove this parent from its parent set and discover new parents if necessary. If a non-storing backup parent changes its MOP to 2 or 3 and the child node has a storing default parent, the node may re-select default parent. If the node has a non-storing default parent, the node selects this parent as default parent and computes new rank. If the node is a non-storing node, the node transmits H-DIO packet without changing its MOP. However, if the node is an acting non-storing node, the node transmits H-DIO packet with MOP set to 2 or 3. If the non-storing default parent changes its MOP to −1, the child node can remove this parent from its parent set. The node selects a non-storing backup parent as default parent, computes new rank and transmits H-DIO without changing its MOP. The node may discover new parents if necessary. If the non-storing default parent changes its MOP to 2 or 3, the child node keeps this parent as default parent and computes new rank. If the node is non-storing node, the node transmits H-DIO without changing its MOP. If the node is acting non-storing node, the node transmits H-DIO packet with MOP set to 2 or 3.

It is possible that a leaf node changes its MOP from −1 to 0, 1, 2 or 3. For example, a low battery node switches its power source from battery to power grid. The neighbor can utilize this MOP upgrade. If a leaf node changes its MOP from −1 to 0 or 1, the neighbors may add this node as a non-storing parent. If a leaf node changes its MOP from −1 to 2 or 3, neighbors may add this node as a storing parent. Most importantly, the acting non-storing node can change its MOP back to storing MOP.

Once a node changes MOP from leaf MOP or non-storing MOP to storing MOP, the node joins the first tier network topology.

Once a node changes MOP from storing MOP to leaf MOP or non-storing MOP, the node does not need routing table and source routing database. However, the node may or may not delete routing table and source routing database.

Upward Data Packet Delivery in H-RPL

The objective function and routing metrics are used in discovering multiple routing paths, i.e., selecting multiple parents in H-DODAG topology. Once selected, the parents are used for a period of time to maintain network stability. A critical question is that to which parent a child should send packet?

In conventional RPL, a data node forwards all upward packets to its default parent. This approach can cause severe data packet drop due to buffer overflow and severe packet delay due to unavailability of default parent. For example, if a data node selects a battery node as default parent, which occasionally goes to sleep to save battery energy. In this case, the child node has to buffer packets because default parent is in sleep. This can cause buffer overflow of the child node. In another example, multiple data nodes select same node as default parent. Therefore, multiple nodes send all packets to same node, which can cause buffer overflow of the default parent.

According to various embodiments of the invention, data node forwards data packet to the parent that has route to the sub H-DODAG root determined based on task ID, data nodes distribute upward data packet to multiple parents based on buffer occupancy of the parents. A method is provided to achieve the goal.

Unlike routing memory section 290, which is used to build up and maintain network topology H-DODAG, the routing buffer memory section 280 is used to buffer data packets during network operation. The embodiments of the invention introduce buffer occupancy index (BOI), which is defined as average number of packets buffered divided by buffer size, i.e., size of routing buffer memory section 280. Using BOI, the H-RPL protocol distributes data packets to parents instead of forwarding all packets to default parent.

Figure 10A:
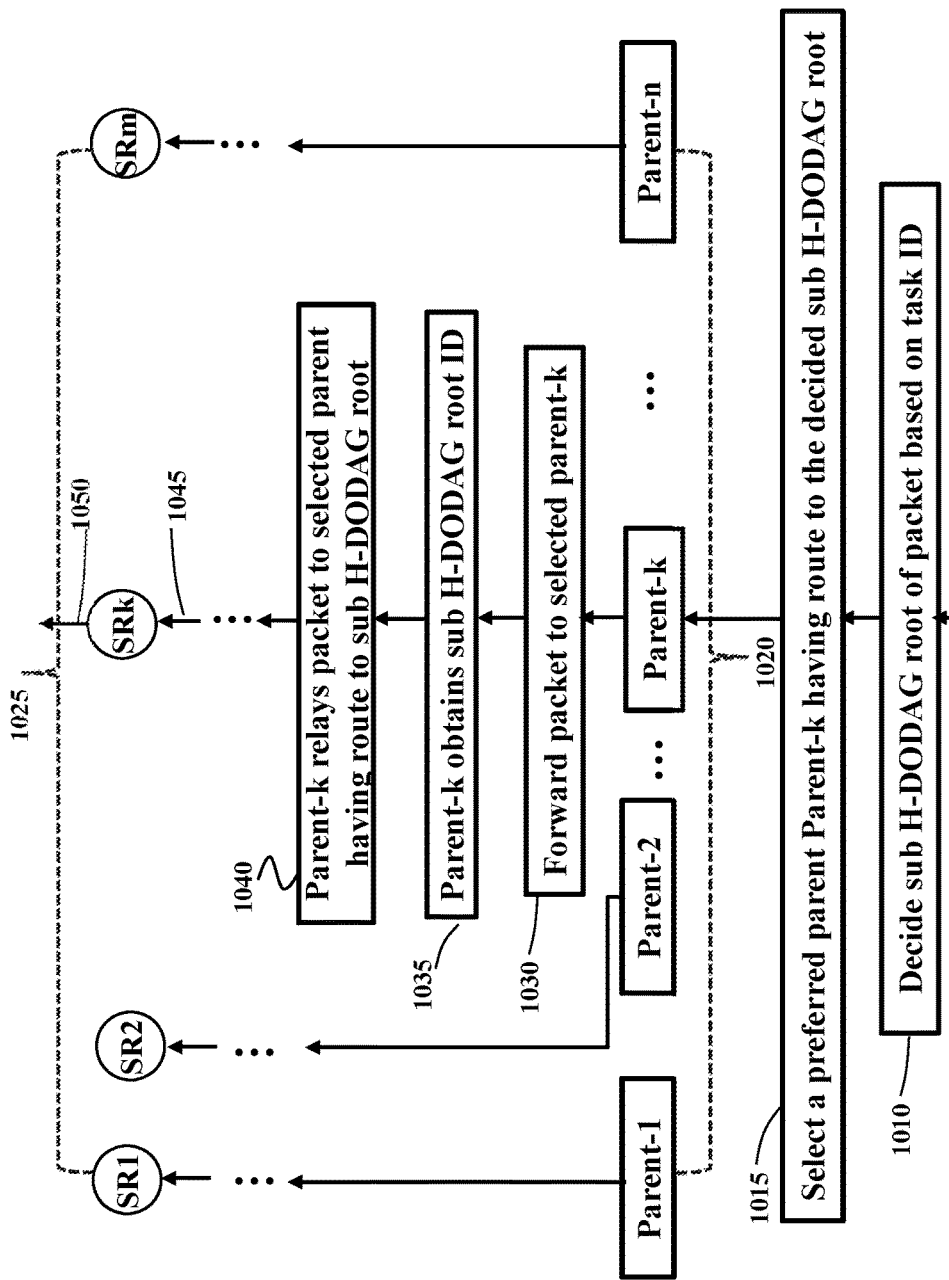
FIG. 10A is a schematic of data node sending upward packets to the sink node based on task ID according to some embodiments of the invention.

FIG. 10A shows block diagram of upward packets delivery, in which a node has an upward data packet 1005 to send. In H-RPL network, there are multiple tasks to be carried out. Each data packet is associated with a task ID. Based on task ID, the node determines 1010 which sub H-DODAG root related to the task by using recorded objective function and routing metrics. Assume the node has a parent set 1020 including n parents, which connect the node to in sub H-DODAG roots 1025 including SR1, SR2, . . . , SRm. Once sub H-DODAG root is determined, the node selects 1015 a preferred parent Parent-k that has route to the decided sub H-DODAG root as described in FIG. 10B. The node includes sub H-DODAG root ID in the packet and 1030 forwards packet to the Parent-k. Upon receiving the packet, Parent-k obtains 1035 the sub H-DODAG root ID from the packet and relays 1040 the packet by selecting a preferred parent similarly as data node does. The data packet finally reaches 1045 sub H-DODAG root SRk, which forward 1050 the packet to the sink node according to the first tier of H-DODAG topology.

Figure 10B:
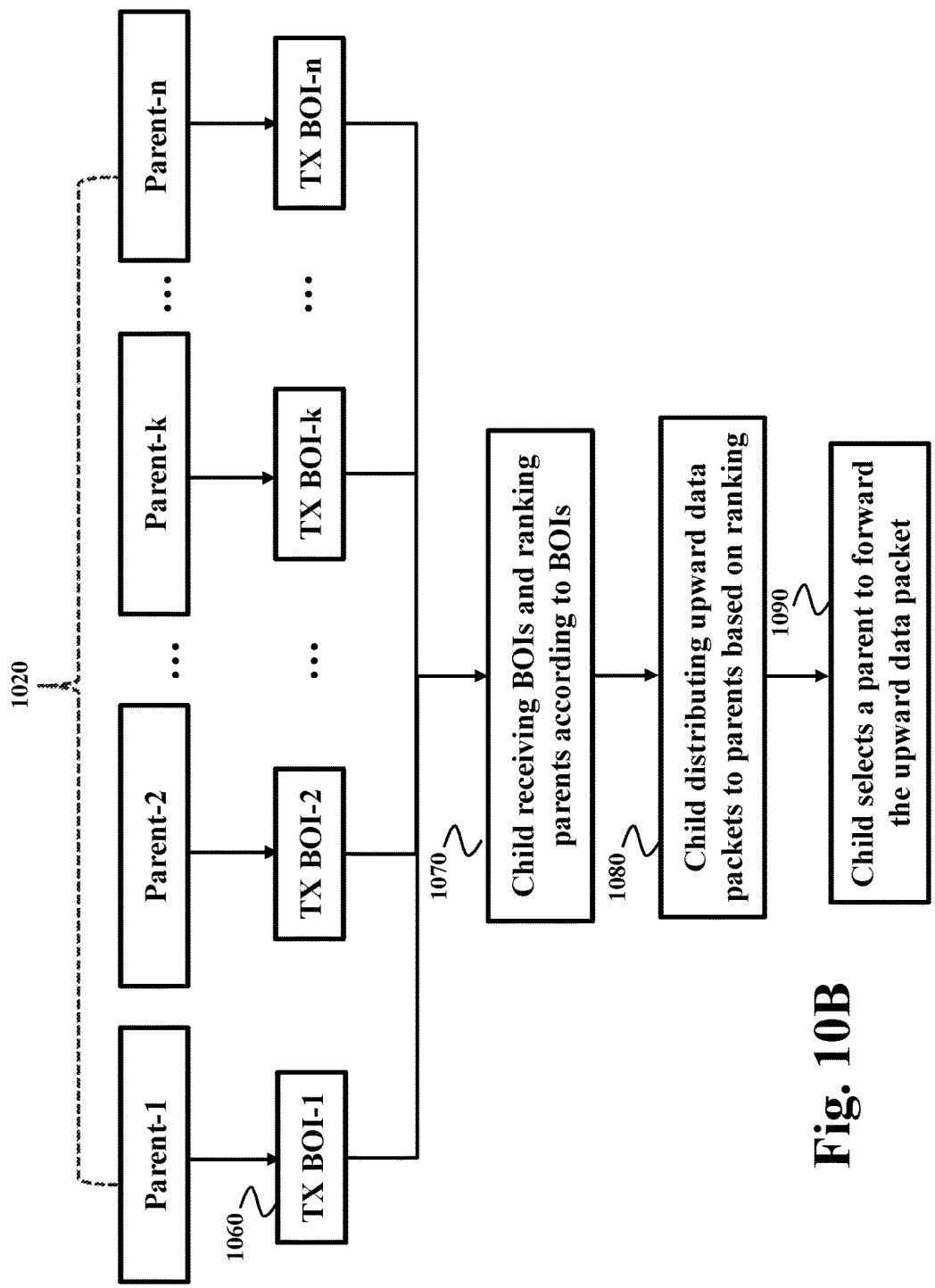
FIG. 10B is a schematic of data node selecting a parent to forward upward packets based on queue occupancy index (QOI) according to some embodiments of the invention.

FIG. 10B shows block diagram of preferred parent selection to forward a data packet if there are multiple parents having routes to a sub H-DODAG root, in which a child node has a parent set 1020 including n parents. Each parent computes its BOI and transmits 1060 BOI. The child node receives BOIs from parents and ranks 1070 parents according to received BOIs. The parent with higher BOI gets a lower ranking and parent with lower BOI gets a higher ranking. The child node then distributes 1080 upward packets to parents proportional to BOI ranking Finally, the child node selects 1090 parent to forward the upward data packet.

Benefits of packet distribution include: (1) load balance since a node distributes packets to multiple parents; (2) parent buffer overflow reduction since each parent receives only a portion of packets from a child; (3) child buffer overflow reduction since child node does not only wait for default parent to be available, the child node leverages all available parents; (4) packet delivery rate improvement since less packets being dropped due to buffer overflow; and (5) packet delay reduction since distribution of packets decreasing packet buffering time.

A parent node can transmit its BOI included in other packet such as data packet or transmits its BOI as a separate packet. Following is a method to compute BOI.

To compute BOI, a node first computes average number of packets buffered in a given time period $[t_{i-1}, t_i]$. Let NoP(t) be number of packets in buffer at time t, then average number of packets (ANP) buffered is mathematically defined as $$ANP(t_{i-1}, t_i) = \frac{1}{t_i - t_{i-1}} * \int_{t_{i-1}}^{t_i} NoP(t)\,dt \qquad (12)$$

The measurements in time period $[t_{i-1}, t_i]$ can be used to estimate ANP. Let $NoP_i$ be number of packets pushed into buffer in time period $[t_{i-1}, t_i]$ and $BT_i$ be average amount of time a packet buffered in time period $[t_{i-1}, t_i]$, then using Little's theorem, the ANP can be estimated as $$ANP(t_{i-1}, t_i) = \frac{BT_i * NoP_i}{(t_i - t_{i-1})} \qquad (13)$$

and BOI can be estimated as $$BOI = \frac{BT_i * NoP_i}{B_C * (t_i - t_{i-1})} \qquad (14)$$

where $B_C$ is buffer capacity, i.e., size of routing buffer memory section 280 divided by average packet size.

According to various embodiments of the invention, a data node cannot send any packet to a node that has announced MOP=−1 because a node with MOP=−1 can only be leaf node.

Downward Data Packet Delivery in H-RPL

According to various embodiments of the invention, the root or a storing node has two ways to send or relay a downward packet to destination, i.e., using source routing or using routing table. It is possible that the root or a storing router has multiple choices to send a downward packet. However, one embodiment sends downward packet using routing table, because the routing table does not need source routing path and packet is smaller in size. Smaller packet has higher delivery reliability. A non-storing node only relays a downward packet using source routing path.

Figure 11A:
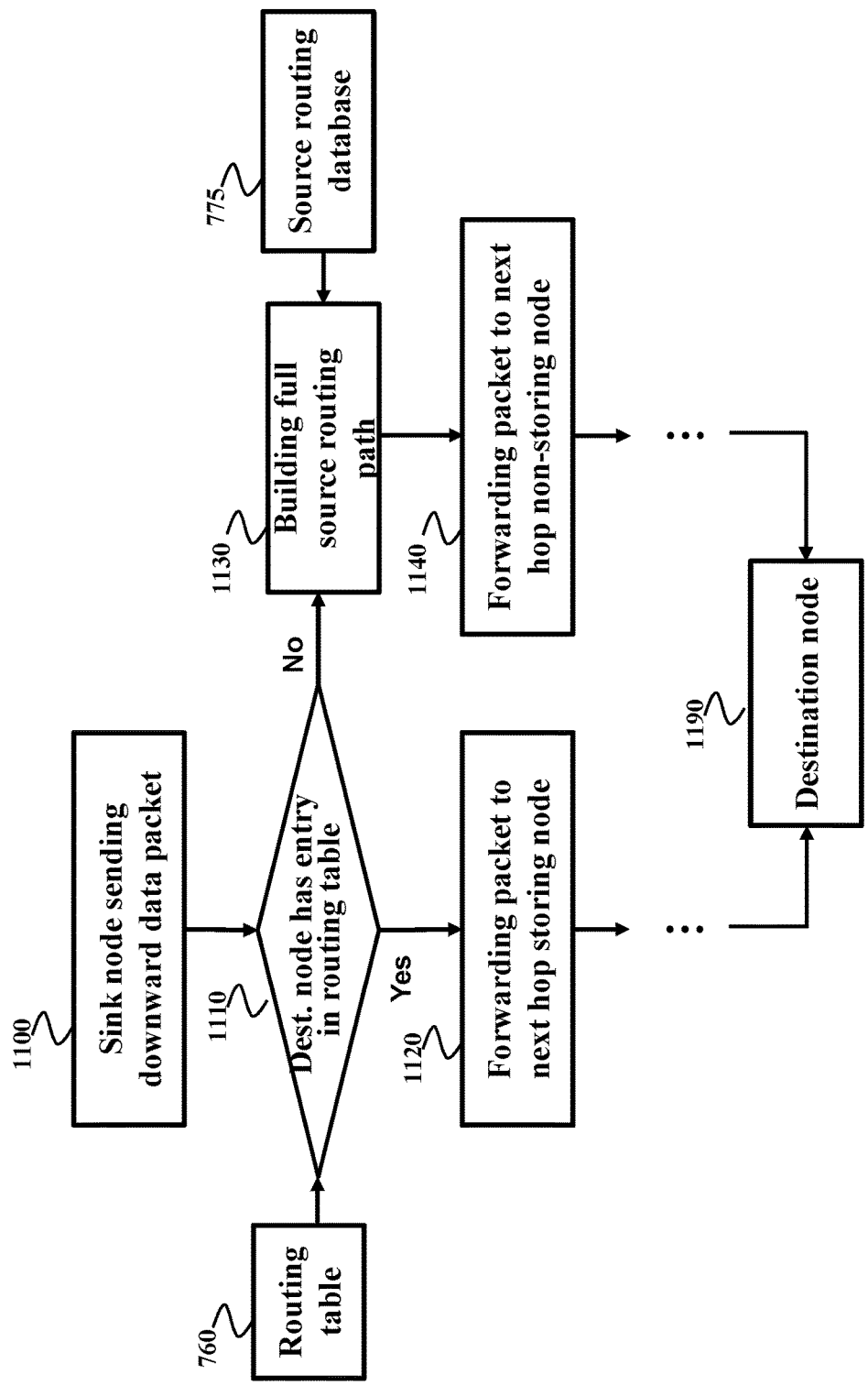
FIG. 11A is a schematic of two ways of sink node sending a downward packet to the destination using routing table and source routing database according to some embodiments of the invention.

FIG. 11A shows block diagram of the sink node sending 1100 downward packet. The sink node first 1110 checks if destination node 1190 is in its routing table 760. If yes, sink node forwards 1120 packet to next hop storing node. If no, sink node builds 1130 a full source routing path from sink to destination node by using its source routing database 775, i.e., child-parent database. Sink node then forwards 1140 packet to next hop non-storing node. The packet is eventually relayed to destination node 1190.

Figure 11B:
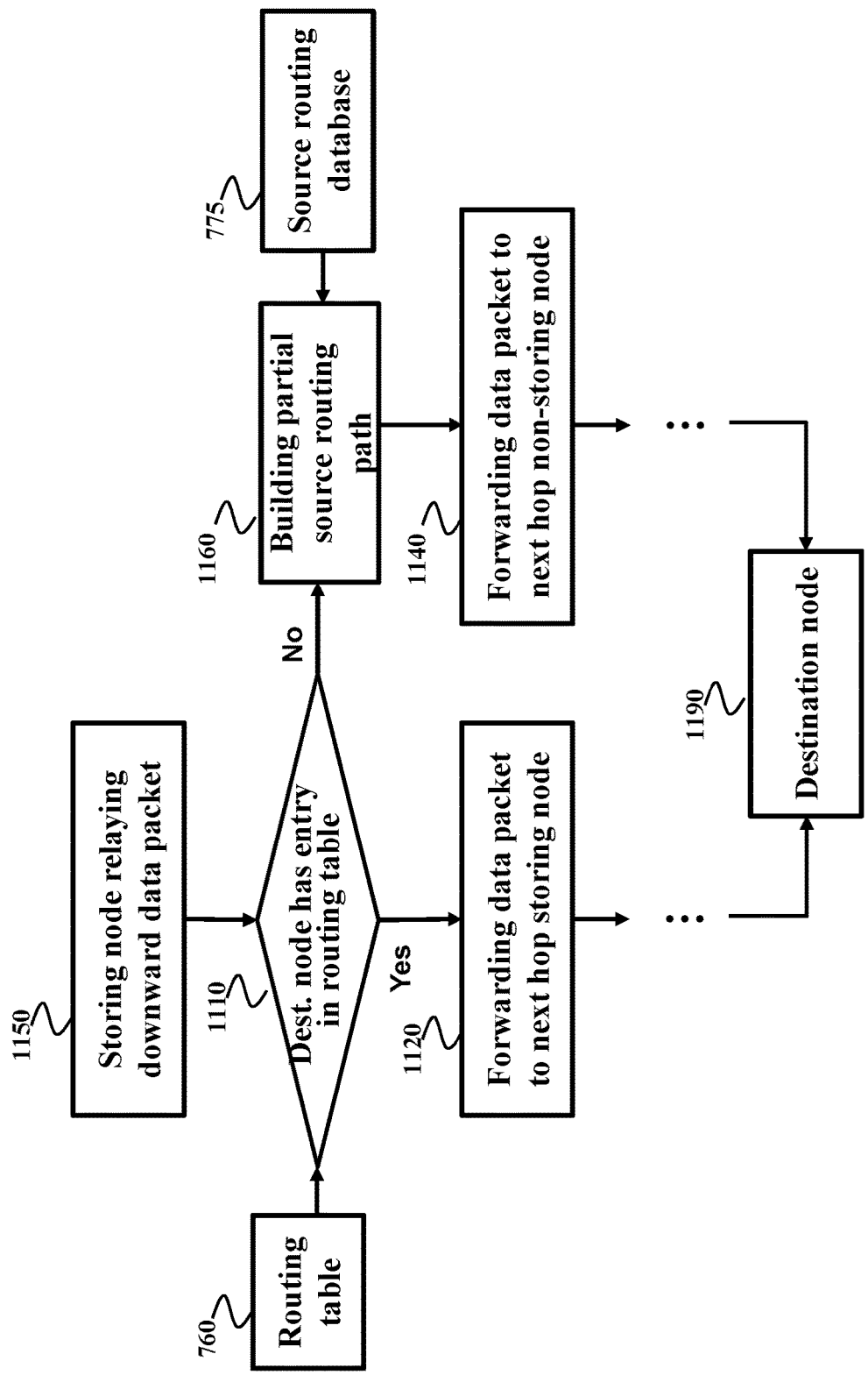
FIG. 11B is a schematic of two ways of storing node relaying a downward packet to the destination using routing table and source routing database according to some embodiments of the invention.

FIG. 11B depicts block diagram of a storing node relaying 1150 downward packet. The storing node also first 1110 checks if destination node 1190 is in its routing table 760. If yes, storing node forwards 1120 packet to next hop storing node. If no, storing node builds 1160 a partial source routing path from the storing node to destination node by using its source routing database 775, i.e., child-parent database. Storing node then forwards 1140 packet to next hop non-storing node. The packet is eventually relayed to destination node 1190.

FIG. 11C shows block diagram of a non-storing node relaying 1170 downward packet. The non-storing node finds 1180 next hop non-storing node in received source routing path. The non-storing node then forwards 1140 packet to next hop non-storing node. The packet is eventually relayed to destination node 1190.

According to various embodiments of the invention, the sink node or a storing node cannot forward a downward packet via a node that has announced MOP=−1 or 0 because a node with MOP=−1 can only be leaf node and a node with MOP=0 does not support downward routing. The sink node or a storing node can also not build a source routing path including any node that has announced MOP=−1 or 0.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format. The processor can be connected to memory, transceiver, and input/output interfaces as known in the art.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for routing packets in a multi-hop heterogeneous wireless network partitioned into a set of subnetworks including a first subnetwork having a first sink node and a second subnetwork having a second sink node, wherein a node forms at least a part of the first subnetwork and at least a part of the second subnetwork, wherein steps of the method are performed using a processor of the node, comprising:
   determining an available routing resource of the node as a function of an allocated routing memory (ARM) in the node and a remaining expected routing lifetime (ERL) of the node;
   determining at least one required routing resource of the node as a function of a routing protocol used by the node for a subnetwork, a logical location of the node in the subnetwork, and a data traffic in the subnetwork through the node, wherein the determining the required routing resource includes determining a first required routing resource of the node for the first subnetwork and determining a second required routing resource of the node for the second subnetwork, wherein the first required routing resource differs from the second required routing resource;
   determining, using the available routing resource and the first required routing resource, a first mode of operation (MOP) specifying a type of the routing of the node in the first subnetwork;
   determining, using the available routing resource and the second required routing resource, a second MOP specifying a type of the routing of the node in the second subnetwork, wherein the first MOP differs from the second MOP; and
   routing packets in the first subnetwork according to the first MOP and routing packets in the second subnetwork according to the second MOP.

2. The method of claim 1, further comprising:
   detecting a change in at least one of the available routing resource, the first required routing resource, and the second required routing resource; and
   updating one or combination of the first MOP and the second MOP in response to detecting the change.

3. The method of claim 1, further comprising:
   determining the logical connection in the first and the second subnetworks from corresponding control packets transmitted within the first and the second subnetworks.

4. The method of claim 1, further comprising:
   partitioning the network into the subnetworks according to one or combination of different objective functions and different routing metrics, such that each subnetwork has a unique combination of the objective function and the routing metric.

5. The method of claim 4, further comprising:
   retrieving a list of combinations of the objective functions and the routing metrics of the network from control packets transmitted within the network;
   comparing suitability of each combination for different tasks of the node to select one or several subnetworks to join; and
   joining the selected subnetworks.

6. The method of claim 1, further comprising:
   determining a set of network parameters of the node from a set of control packets, wherein the set of network parameters includes one or combination of MOP of neighboring nodes, ranks of the neighboring nodes that specify relative distances of the neighboring nodes to the first or the second sink, a size of the first and the second subnetworks, a set of objective functions and a set of routing metrics of the first and the second subnetworks, a set of routing preferences of K-Hop neighboring nodes, a set of route entries of the node and a set of child-parent entries of the node.

7. The method of claim 1, wherein the first MOP or the second MOP is a leaf MOP, an upward MOP, a non-storing MOP, a storing MOP or a multicast storing MOP, wherein the node operating according to the leaf MOP does not route packets, wherein the node operating according to the upward MOP only routes upward packets, wherein the node operating according to the non-storing MOP routes the packets without storing route entries, wherein the node operating according to the storing MOP routes the packets while storing route entries, and wherein the node operating according to the multicast storing MOP routes the packets while storing route entries and multicast information.

8. The method of claim 1, wherein the nodes in the network are organized into hierarchical destination oriented directed acyclic graph (H-DODAG) topology based on MOPs of the nodes, set of heterogeneous objective functions and set of heterogeneous routing metrics; wherein the MOPs of the nodes, the objective functions and routing metrics are different at different portion of network; wherein the objective functions and routing metrics are grouped into sets of one to many maps between an objective function and corresponding routing metrics; wherein the first set of objective function and routing metrics are used by the sink node and storing nodes to build the first tier of H-DODAG topology; wherein other sets of objective function and routing metrics are used by storing nodes, non-storing nodes, upward nodes and leaf nodes to build other tiers of H-DODAG topology; wherein non-storing nodes, upward nodes and leaf nodes join H-DODAG topology using the second set of objective function and routing metrics.

9. The method of claim 8, wherein the control packets include H-DODAG Information Object (H-DIO) packet, hierarchical destination advertisement object (H-DAO) packets, and H-DODAG Information Solicitation (H-DIS) packet, wherein H-DIO packet contains information to build upward routes from the data nodes to the sink node and MOP of the node transmitting H-DIO the packet, wherein H-DAO packet contains information to construct downward routes from the sink node to the data nodes and MOP of the destination node, wherein H-DAO includes a non-storing H-DAO (N-H-DAO) and a storing H-DAO (S-H-DAO), wherein N-H-DAO includes a child-parent entry and S-H-DAO generates a routing entry.

10. The method of claim 7, wherein the node determines MOP based on the ARM and a required routing memory (RRM) of the node according to $$MOP = \begin{cases} -1, & \text{if } ARM < RRM_U^{min} \\ 0, & \text{if } RRM_U^{min} \leq ARM < RRM_N^{min} \\ 1, & \text{if } RRM_N^{min} \leq ARM < RRM_S^{min} \\ 2, & \text{if } RRM_S^{min} \leq ARM < RRM_M^{min} \\ 3, & \text{if } ARM \geq RRM_M^{min} \end{cases}$$

wherein $RRM_U^{min}$, $RRM_N^{min}$, $RRM_M^{min}$ and $RRM_M^{min}$ are positive thresholds.

11. The method of claim 7, wherein the node determines MOP based on an expected routing lifetime (ERL) of the node according to $$MOP = \begin{cases} -1, & \text{if } ERL < ERL_U^{min} \\ 0, & \text{if } ERL_U^{min} \leq ERL < ERL_N^{min} \\ 1, & ERL_N^{min} \leq ERL < ERL_S^{min} \\ 2, & \text{if } ERL_S^{min} \leq ERL < ERL_S^{min} \\ 3, & \text{if } ERL \geq ERL_U^{min} \end{cases}$$

wherein $ERL_U^{min}$, $ERL_N^{min}$, $ERL_S^{min}$ and $ERL_M^{min}$ are positive thresholds.

12. The method of claim 7, wherein the node determines MOP based on a combination of the ARM of the node, a required routing memory (RRM) of the node, and an expected routing lifetime (ERL) of the node according to $$MOP = \begin{cases} -1, & \text{if } ERL < ERL_U^{min} \text{ or } ARM < RRM_U^{min} \\ 0, & \text{if } ERL_U^{min} \leq ERL < ERL_N^{min} \text{ and } RRM_U^{min} \leq ARM \\ 0, & \text{if } ERL_U^{min} \leq ERL \text{ and } RRM_U^{min} \leq ARM < RRM_N^{min} \\ 1, & \text{if } ERL_N^{min} \leq ERL < ERL_S^{min} \text{ and } RRM_N^{min} \leq ARM \\ 1, & \text{if } ERL_N^{min} \leq ERL \text{ and } RRM_N^{min} \leq ARM < RRM_S^{min} \\ 2, & \text{if } ERL_S^{min} \leq ERL < ERL_M^{min} \text{ and } RRM_S^{min} \leq ARM \\ 2, & \text{if } ERL_S^{min} \leq ERL \text{ and } RRM_S^{min} \leq ARM < RRM_M^{min} \\ 3, & \text{if } ERL \geq ERL_M^{min} \text{ and } ARM \geq RRM_M^{min} \end{cases}$$

wherein $RRM_U^{min}$, $RRM_N^{min}$, $RRM_S^{min}$, $RRM_M^{min}$, $ERL_U^{min}$, $ERL_N^{min}$, $ERL_S^{min}$ and $ERL_M^{min}$ and ERL are positive thresholds.

13. A multi-hop wireless network including multiple nodes with different computational and energy resources, wherein the network is partitioned into a multiple subnetworks having a unique combination of objective functions and routing metrics, wherein at least one node joins multiple subnetworks and operates according to different modes of operation (MOPs) specifying different types of routing for different subnetworks, wherein the node is configured for
determining an available routing resource of the node as a function of an allocated routing memory (ARM) in the node and a remaining expected routing lifetime (ERL) of the node;
determining at least one required routing resource of the node as a function of a routing protocol used by the node for a subnetwork, a logical location of the node in the subnetwork, and a data traffic in the subnetwork through the node, wherein the determining the required routing resource includes determining a first required routing resource of the node for the first subnetwork and determining a second required routing resource of the node for the second subnetwork, wherein the first required routing resource differs from the second required routing resource;
determining, using the available routing resource and the first required routing resource, a first mode of operation (MOP) specifying a type of the routing of the node in the first subnetwork;
determining, using the available routing resource and the second required routing resource, a second MOP specifying a type of the routing of the node in the second subnetwork, wherein the first MOP differs from the second MOP; and
routing packets in the first subnetwork according to the first MOP and routing packets in the second subnetwork according to the second MOP.

14. The network of claim 13, wherein the node in the network modifies the MOP of the node in response to a change of a parameter of operation of the node.

15. The network of claim 13, wherein the MOP is a leaf MOP, an upward MOP, a non-storing MOP, a storing MOP or a multicast storing MOP, wherein the node operating according to the leaf MOP does not route packets, wherein the node operating according to the upward MOP only routes upward packets, wherein the node operating according to the non-storing MOP routes the packets without storing route entries, wherein the node operating according to the storing MOP routes the packets while storing route entries, and wherein the node operating according to the multicast storing MOP routes the packets while storing route entries and multicast information.

16. A node for routing packets in a heterogeneous wireless network, comprising:
a transceiver to transmit and receive packets;
a memory to store at least part of the packets, route entries, child-parent entries, K-Hop neighbor routing preferences; and
a processor to join multiple subnetworks based on combinations of objective functions and routing metrics of the subnetworks and to determine different modes of operation (MOPs) specifying different types of routing for different subnetworks, wherein the processor is configured for
determining an available routing resource of the node as a function of an allocated routing memory (ARM) in the node and a remaining expected routing lifetime (ERL) of the node;
determining at least one required routing resource of the node as a function of a routing protocol used by the node for a subnetwork, a logical location of the node in the subnetwork, and a data traffic in the subnetwork through the node, wherein the determining the required routing resource includes determining a first required routing resource of the node for the first subnetwork and determining a second required routing resource of the node for the second subnetwork, wherein the first required routing resource differs from the second required routing resource;

determining, using the available routing resource and the first required routing resource, a first mode of operation (MOP) specifying a type of the routing of the node in the first subnetwork;

determining, using the available routing resource and the second required routing resource, a second MOP specifying a type of the routing of the node in the second subnetwork, wherein the first MOP differs from the second MOP; and routing packets in the first subnetwork according to the first MOP and routing packets in the second subnetwork according to the second MOP.

17. The node of claim 16, wherein the processor is configured for detecting a change in at least one of the available routing resource, the first required routing resource, and the second required routing resource; and updating one or combination of the first MOP and the second MOP in response to detecting the change.

18. The node of claim 16, wherein the MOP is a leaf MOP, an upward MOP, a non-storing MOP, a storing MOP or a multicast storing MOP, wherein the node operating according to the leaf MOP does not route packets, wherein the node operating according to the upward MOP only routes upward packets, wherein the node operating according to the non-storing MOP routes the packets without storing route entries, wherein the node operating according to the storing MOP routes the packets while storing route entries, and wherein the node operating according to the multicast storing MOP routes the packets while storing route entries and multicast information.

* * * * *